United States Patent
Qiu

(10) Patent No.: US 12,492,085 B2
(45) Date of Patent: Dec. 9, 2025

(54) APPARATUS FOR SURFACE TREATMENT OF VEHICLES OR VEHICLE PARTS

(71) Applicant: Jiangsu Changhong Intelligent Equipment Co. Ltd., Jiangsu (CN)

(72) Inventor: Yunjie Qiu, Jiangsu (CN)

(73) Assignee: Jiangsu Changhong Intelligent Equipment Co. Ltd., Jiangsu (CN)

( * ) Notice: Subject to any disclaimer, the term of this patent is extended or adjusted under 35 U.S.C. 154(b) by 879 days.

(21) Appl. No.: 17/624,011

(22) PCT Filed: Jul. 2, 2020

(86) PCT No.: PCT/CN2020/099955
§ 371 (c)(1),
(2) Date: Dec. 30, 2021

(87) PCT Pub. No.: WO2021/000919
PCT Pub. Date: Jan. 7, 2021

(65) Prior Publication Data
US 2022/0348421 A1    Nov. 3, 2022

(30) Foreign Application Priority Data

Jul. 2, 2019    (IT) .................. 102019000010710
Oct. 10, 2019    (CN) .................. 201910959713.3

(51) Int. Cl.
 *B65G 49/04* (2006.01)
 *C25D 13/22* (2006.01)
(52) U.S. Cl.
 CPC ......... *B65G 49/0463* (2013.01); *C25D 13/22* (2013.01); *B65G 2201/0294* (2013.01)

(58) Field of Classification Search
 CPC ........ B65G 49/0463; B65G 2201/0294; C25D 13/22
 See application file for complete search history.

(56) References Cited

U.S. PATENT DOCUMENTS

| 6,419,983 B1 * | 7/2002 | Kreuzer ................... B05C 3/10 |
| | | 427/242 |
| 6,676,755 B2 * | 1/2004 | Ehrenleitner .......... C25D 13/22 |
| | | 118/423 |

(Continued)

FOREIGN PATENT DOCUMENTS

| CN | 1232413 A | * 10/1999 | ............... B05C 3/10 |
| CN | 1503759 A | 6/2004 | |

(Continued)

OTHER PUBLICATIONS

Italian Search Report corresponding to 102019000010710 mailed Mar. 4, 2020.

(Continued)

*Primary Examiner* — Jason C Smith
(74) *Attorney, Agent, or Firm* — Finch & Maloney PLLC

(57) ABSTRACT

An apparatus (1) for the surface treatment of the structure of a vehicle (V) by complete immersion in treatment baths contained in treatment tanks (2) comprises a plurality of trolleys (3) moved in a treatment path (P) by means of driver chain means (4), these trolleys can be selectively hooked in engagement with said chain drive means (4), are supported by opposite support and sliding guides (9) extended along said path (P) and have a portion (12) engaged with cam-slider-coupling with cam elements (11) arranged along said path (P) to determine a complete rotation of said trolleys around an axis of transverse rotation at said treatment tanks (2).

19 Claims, 23 Drawing Sheets

(56) References Cited

U.S. PATENT DOCUMENTS

| | | | | |
|---|---|---|---|---|
| 10,106,337 | B2* | 10/2018 | Robbin | B65G 49/0459 |
| 10,179,342 | B2* | 1/2019 | Robbin | B05C 3/10 |
| 10,370,197 | B2* | 8/2019 | Iglio | B65G 49/025 |
| 10,487,414 | B2* | 11/2019 | Noda | C25D 17/02 |
| 10,968,053 | B2* | 4/2021 | Gabrione | B62D 65/18 |
| 2005/0061616 | A1 | 3/2005 | Krannich et al. | |
| 2005/0139158 | A1 | 6/2005 | Matsubara et al. | |
| 2010/0326832 | A1 | 12/2010 | Albeck et al. | |
| 2022/0348421 | A1* | 11/2022 | Qiu | B65G 49/0463 |

FOREIGN PATENT DOCUMENTS

| | | | | |
|---|---|---|---|---|
| CN | 1616327 | A | | 5/2005 |
| CN | 1636844 | A | | 7/2005 |
| CN | 101910029 | B | | 12/2010 |
| CN | 102083719 | A | | 6/2011 |
| CN | 102817064 | A | | 12/2012 |
| CN | 102851722 | A | | 1/2013 |
| CN | 104114469 | A | | 10/2014 |
| CN | 106115267 | A | | 11/2016 |
| CN | 106494887 | A * | 3/2017 | B05D 1/18 |
| CN | 107074461 | A | | 8/2017 |
| CN | 109607196 | A | | 4/2019 |
| CN | 110775628 | A * | 2/2020 | B65G 49/02 |
| CN | 110791799 | A * | 2/2020 | |
| DE | 19641048 | A1 * | 4/1998 | B05C 3/10 |
| DE | 102017107389 | A1 | | 10/2018 |
| JP | H04362185 | A | | 12/1992 |
| JP | H05255893 | A | | 10/1993 |
| JP | H0710265 | A | | 1/1995 |
| RU | 2267363 | C2 | | 1/2003 |
| WO | WO-2009083081 | A1 * | 7/2009 | B65G 49/0459 |
| WO | WO-2009103400 | A1 * | 8/2009 | B05D 1/18 |
| WO | 2021000446 | A1 | | 1/2021 |

OTHER PUBLICATIONS

Italian Written Opinion corresponding to 102019000010710 mailed Mar. 4, 2020.
Chinese Search Report corresponding to 201910959713.3 mailed Aug. 7, 2020.
Chinese Written Opinion corresponding to 201910959713.3 mailed Aug. 17, 2020.
International Search Report (I) corresponding to PCT/CN2020/099955 mailed Oct. 9, 2020.
Written Opinion (I) corresponding to PCT/CN2020/099955 mailed Oct. 9, 2020.
International Search Report (II) corresponding to PCT/CN2019/110877 mailed Apr. 3, 2020.
Written Opinion (II) corresponding to PCT/CN2019/110877 mailed Apr. 3, 2020.
Russian Search Report corresponding to 2022102034 mailed Oct. 26, 2023.
Russian Grant Decision corresponding to 2022102034 mailed Dec. 18, 2023.
Supplementary European Search Report and Written Opinion corresponding to 20835235.1 mailed Oct. 4, 2023.

* cited by examiner

APPARATUS FOR SURFACE TREATMENT OF VEHICLES OR VEHICLE PARTS

FIELD OF THE INVENTION

This invention relates to an apparatus for surface treatment of components, in particular for the surface treatment of vehicles or vehicle parts.

Within the scope of this invention, the term vehicle is closely connected with what pertains to the world of the automotive industry and, according to an exemplifying and non-exhaustive list, the term vehicle refers to cars, vans, trucks, truck cabins, agricultural machines such as tractors, earth moving machines and the like.

For simplicity of exposition, this description is made in a non-limiting manner with particular reference to cars and to the problems connected with the surface treatment of the bodywork, the chassis of the bodywork or other structural parts of a car, hereinafter referred to as "structure of the vehicle".

BACKGROUND OF THE INVENTION

In the field of cars production, the bodywork, chassis and other structural parts are subjected to multiple treatments such as washing, degreasing, treatment with activating agents, treatment with phosphating agents, passivating treatment, cataphoresis treatment, ultra-filtered treatment and others.

The individual treatments to be carried out on the vehicle structure depend on the production specifications of each car manufacturer.

In any case, although some of the aforementioned treatments, such as for example the degreasing spray, require to be performed with a spray technique, most of such treatments, for example degreasing, phosphating and cataphoresis, must be carried out by complete immersion of the structure of the vehicle in a treatment bathroom. For this purpose, the production plants of the vehicles are equipped with production lines comprising several treatment tanks arranged in succession between them within which a specific treatment bath is contained inside which the vehicle structure must be immersed to carry out the specific treatment.

Generally, the production lines of the motor vehicles comprise a part of the plant formed by a series of about thirteen treatment tanks within which the structure of the vehicle to be treated must be entered.

To this purpose, it is specified that each vehicle, in order to be treated in its structural parts, is solidly supported and fixed to a transport trolley, jargonally called said trolley, which is moved along specific lines of movement and is itself immersed in the treatment tanks.

According to a first type of treatment lines of the parts of the structure of a vehicle, these lines provide a chain-driven system to which the individual trolleys are each time hooked when necessary when they support a vehicle to be treated. This type of treatment lines therefore allows the undoubted advantage of having only the trolleys that transport the structure of a vehicle moved along the drive chain movement, thereby avoiding the immersion of the various empty trolleys in the treatment bathrooms, i.e. without the structure of a vehicle to be treated. Precisely because of this characteristic, plants of this type are generally called "Power & Free".

Each plant, in addition to providing a transport chain for the trolleys and a series of treatment tanks in succession, must provide upstream a station for loading/hooking the trolleys when they transport a vehicle to be treated and, downstream, a station for unloading the trolleys from the chain to allow each trolley to move forward with the relative car being treated towards a subsequent line.

Furthermore, it should be noted that the chains of the aforesaid Power & Free plants provide for hooks integral with the chain and suitable for engaging a specific trolley at the upstream station and for releasing the same trolley at the aforementioned downstream station.

This type of plant, although very widespread, has the drawback of requiring very large lines in consideration of the size of the individual treatment tanks. In fact, in order to obtain the immersion of a trolley and of the respective motor vehicle transported in a treatment tank, it is necessary to achieve a lowering of the whole drive and support line of the chain and of the trolley, and this can only be achieved in front of a treatment tank that provides a ramp of descent at the inlet and a very opposite exit ramp at the exit. In this regard, consider how the inclination used is around 28°-45° and that the required lowering is even higher than one meter. It is only appropriate to point out that inlet and exit ramps from very long treatment tanks cause a considerable and undesired increase in the length of the treatment tanks, as well as an undesired increase in the volume of the treatment tanks themselves.

As an alternative to the aforementioned Power & Free type treatment plants, only Power type plants, e.g. the treatment plants disclosed in the prior art document DE 19641048 A1, have been developed and proposed, wherein the trolleys used to support and move the structure of the vehicle to be treated are always constrained in engagement with two lateral guide chains, one for each side of the trolley, which move synchronously between them. Furthermore, the aforesaid trolleys comprise a first part integrally connected to the side drive and guide chains and a second rotating part that is able to rotate with respect to said first part about an axis of rotation perpendicular to the longitudinal direction of advance of the chains and lying in a plane parallel to the horizontal plane. This second rotating part of the trolley has parts in desmodromic engagement in cams extending longitudinally along the path of advancement of the trolleys with a course such as to cause a rotation of 180° (an overturning) of this rotating part of the trolley with respect to the fixed part at an underlying treatment tank and a further rotation of 180° (in the same direction or in the opposite direction) such as to bring the second rotating part of the trolley back to the initial angular position before the specific trolley lies beyond the exit edge of an underlying treatment tank.

Basically, in the Power-only type apparatuses considered above, the second rotating part of each trolley makes a rotation of 180° at each treatment tank such as to cause a reversal and the consequent rotation immersion of the structure of the vehicle to be treated that is transported. Obviously, as stated, the path of the cams is such as to cause a rotation of the same amplitude as the second rotating part of the trolley before the trolley itself has completely exceeded the exit edge of the treatment tank, so as to avoid interference between the structure of the vehicle to be treated and the treatment tank itself.

Although compared to the Power & Free plants, the Power only plants considered above allow to reduce the extent of the treatment tanks, and therefore their volume, this depends on the fact that the inclined inlet and exit sections are no longer necessary, however, it is worth highlighting that even these plants are not in any case without drawbacks.

First of all, we highlight the problem of being able to operate the two chains in a synchronized way, even in the presence of different wear between the meshes of the two chains, in order to avoid the risk of jamming during the advancement movement of the trolleys.

A further drawback of the Power-only plants considered above is to be found in the fact that the trolleys are integral in advance with the chains, so that they are immersed in the treatment baths of the treatment tanks even when they do not carry any body shell, which leads to higher energy consumption and to an unnecessary increase of pollution of the treatment bath due to the immersion of empty trolleys, i.e. without the structure of the vehicle to be treated.

Given the above, it is therefore evident that nowadays there is a great need for a device for surface treatment of vehicle components and the like that allows to contain as much as possible the longitudinal extension of the treatment tanks that house the treatment baths for treating vehicle structures and at the same time allowing the transport trolleys of the vehicles to be moved only when the latter are actually transporting a vehicle structure to be treated by immersion in the treatment baths contained in the treatment tanks.

SUMMARY OF THE INVENTION

The problem underlying this invention is to devise an apparatus for the surface treatment of components as identified above that has structural and functional characteristics such as to meet the aforesaid requirement, while obviating at the same time the drawbacks mentioned with reference to the known technique.

This problem is solved by an apparatus for surface treatment of components in accordance with the independent claim(s).

BRIEF DESCRIPTION OF THE DRAWINGS

Further characteristics and the advantages of the apparatus for the surface treatment of components according to this invention will be apparent from the following description of some of its preferred embodiments, given by way of non-limiting example, with reference to the attached figures, wherein:

FIG. 5a is a plan view of the detail of a lever with two arms in FIG. 5;

FIG. 20a is a plan view of a detail of a cross with four arms in FIG. 20;

DETAILED DESCRIPTION OF THE INVENTION

Figure 1:
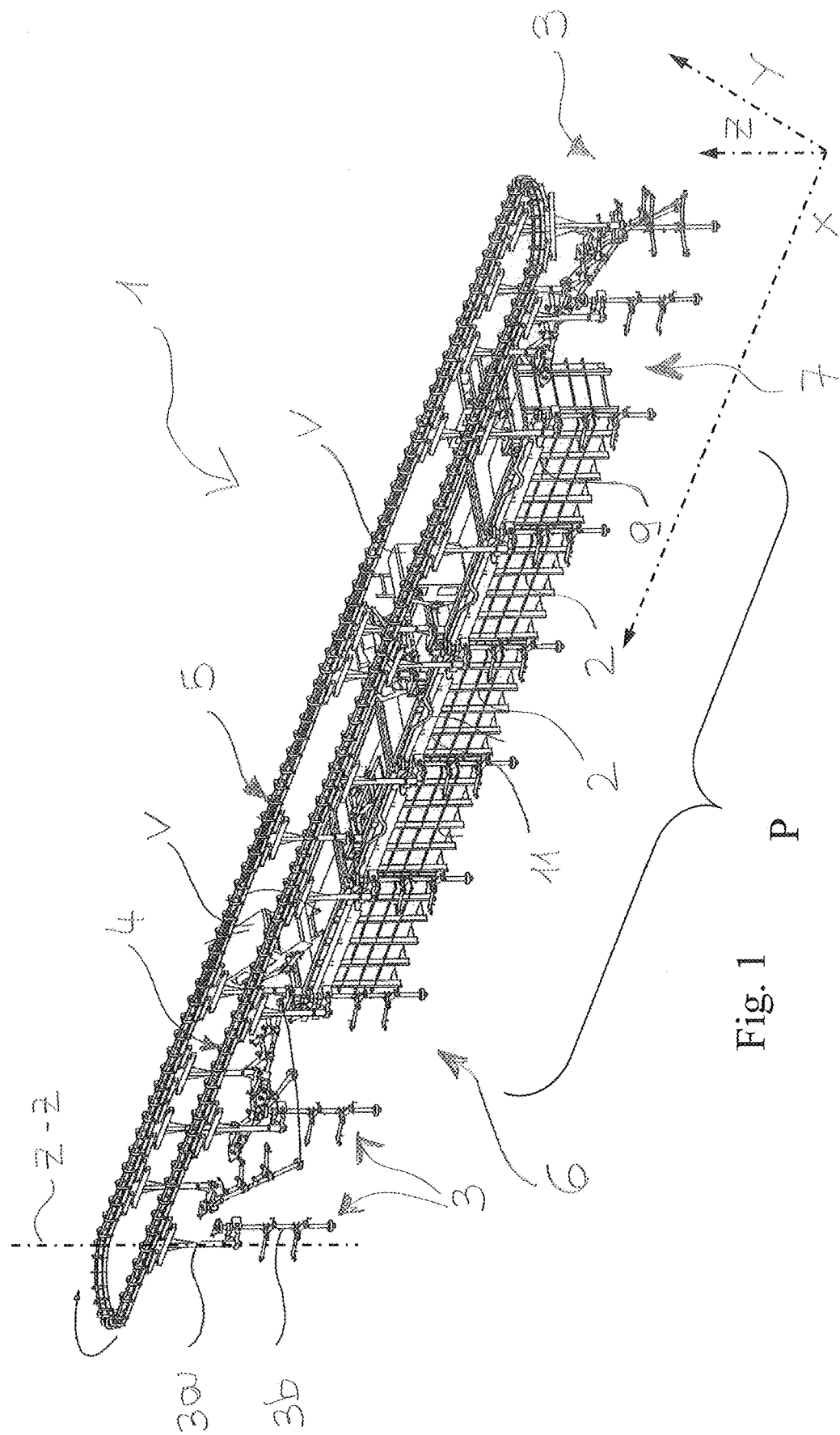
FIG. 1 is an overall perspective view of an apparatus according to this invention in accordance with a first embodiment thereof.
Figure 2:
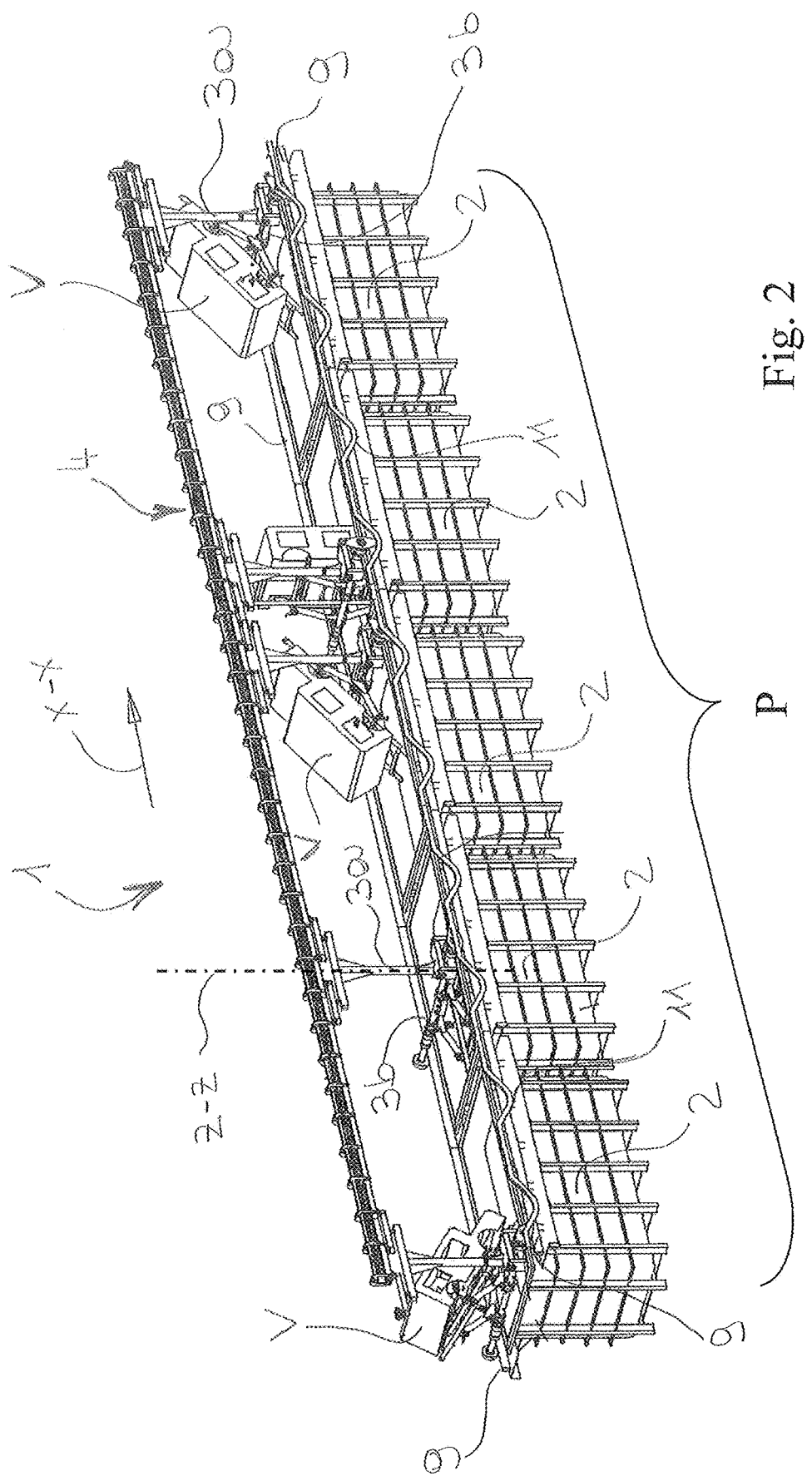
FIGS. 2 and 3 are two distinct perspective views of a portion of the treatment path of the apparatus in FIG. 1 from two different points of view.
Figure 3:
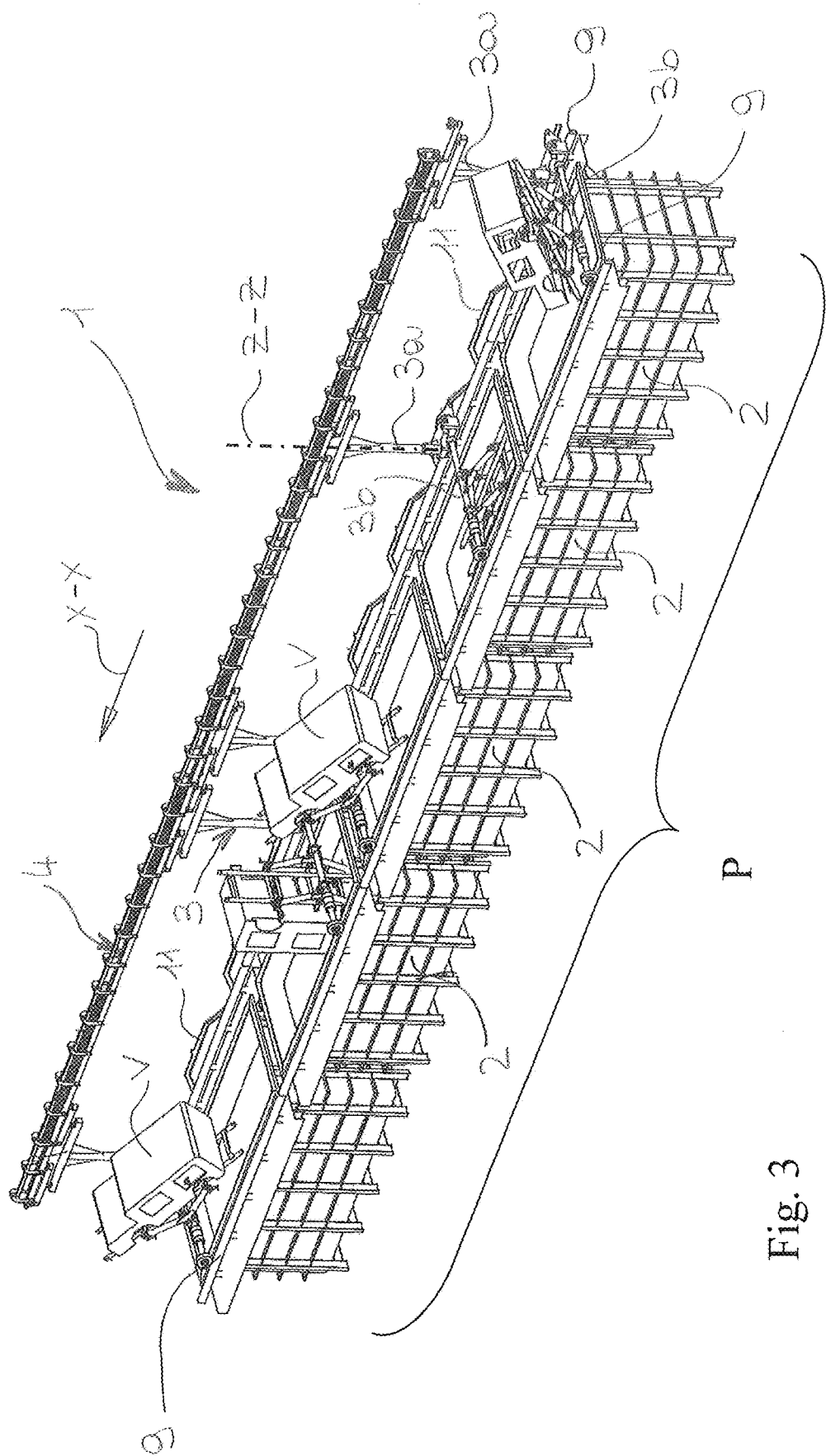
Figure 4:
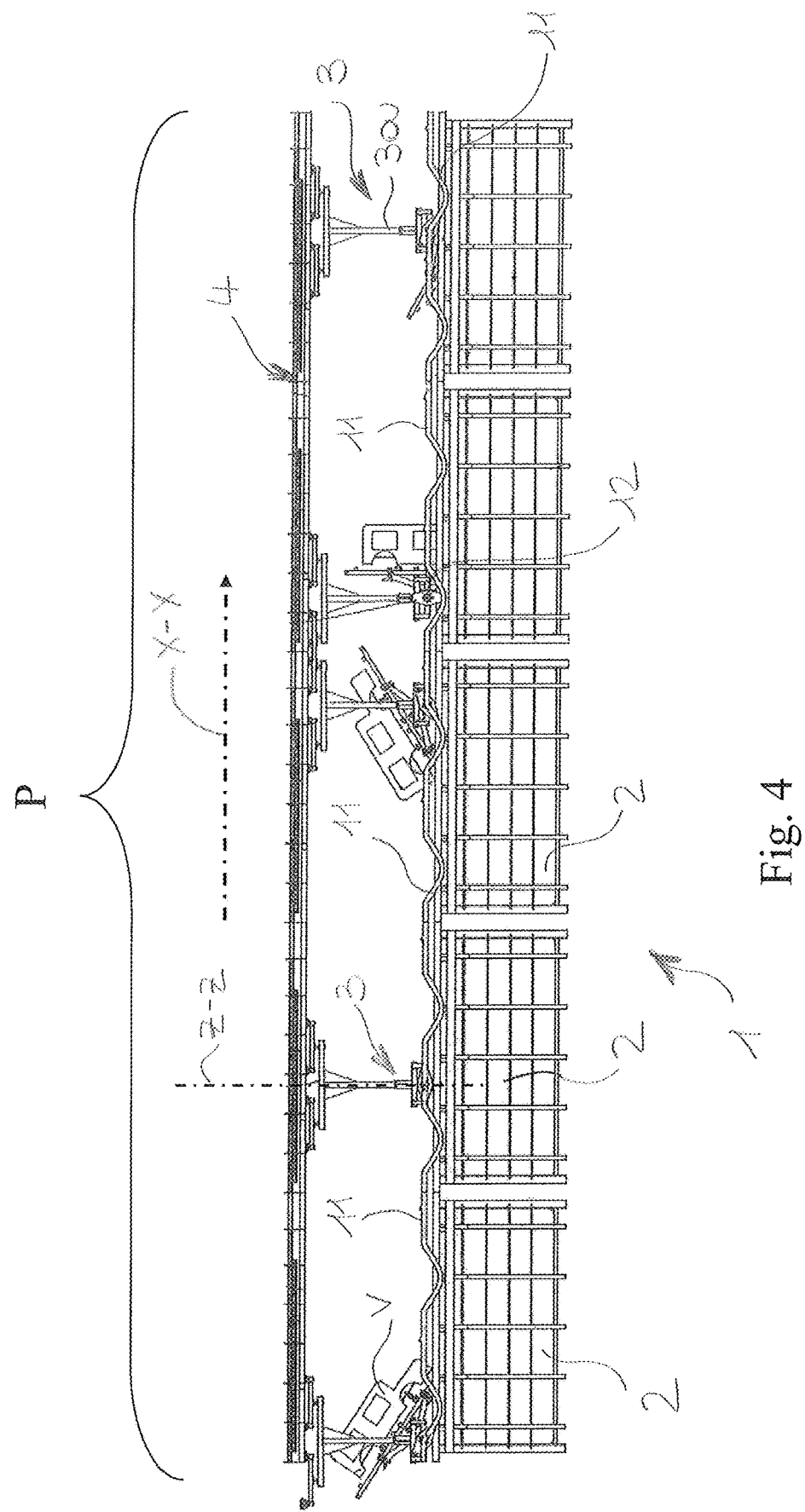
FIG. 4 is a longitudinal plan view of a portion of the treatment path of the apparatus in FIG. 1.
Figure 5:
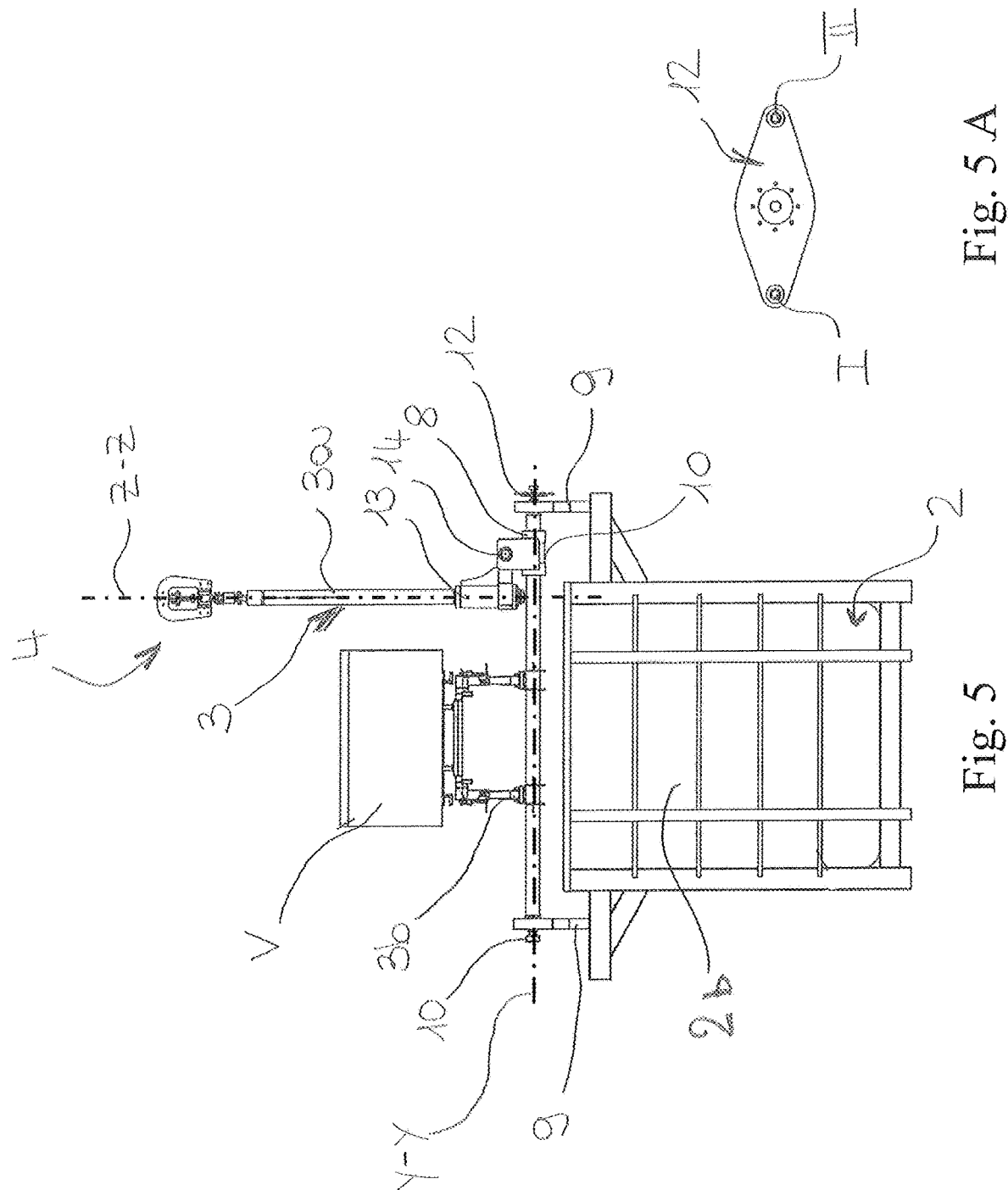
FIG. 5 is a transversal plan view of the treatment path of the apparatus in FIG. 1 with a vehicle structure carried in a higher position with respect to the height of the treatment tanks.
Figures 6, 6A:
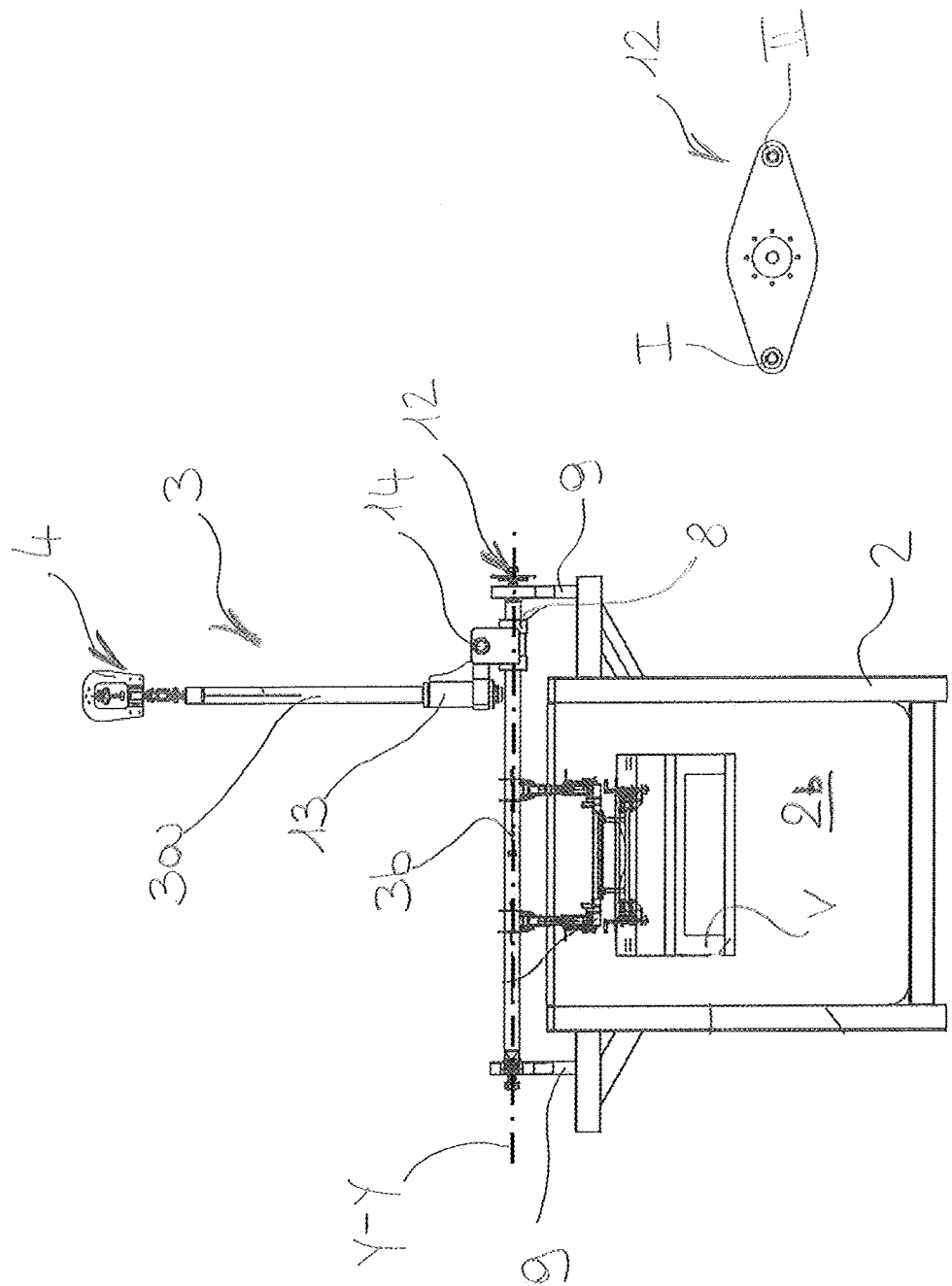
FIG. 6 is a view in partial cross-section of the treatment path of the apparatus in FIG. 1 with a vehicle structure carried in an inverted position inside a treatment tank.
FIG. 6a is a plan view of a detail of a lever with two arms in FIG. 6.
Figure 7:
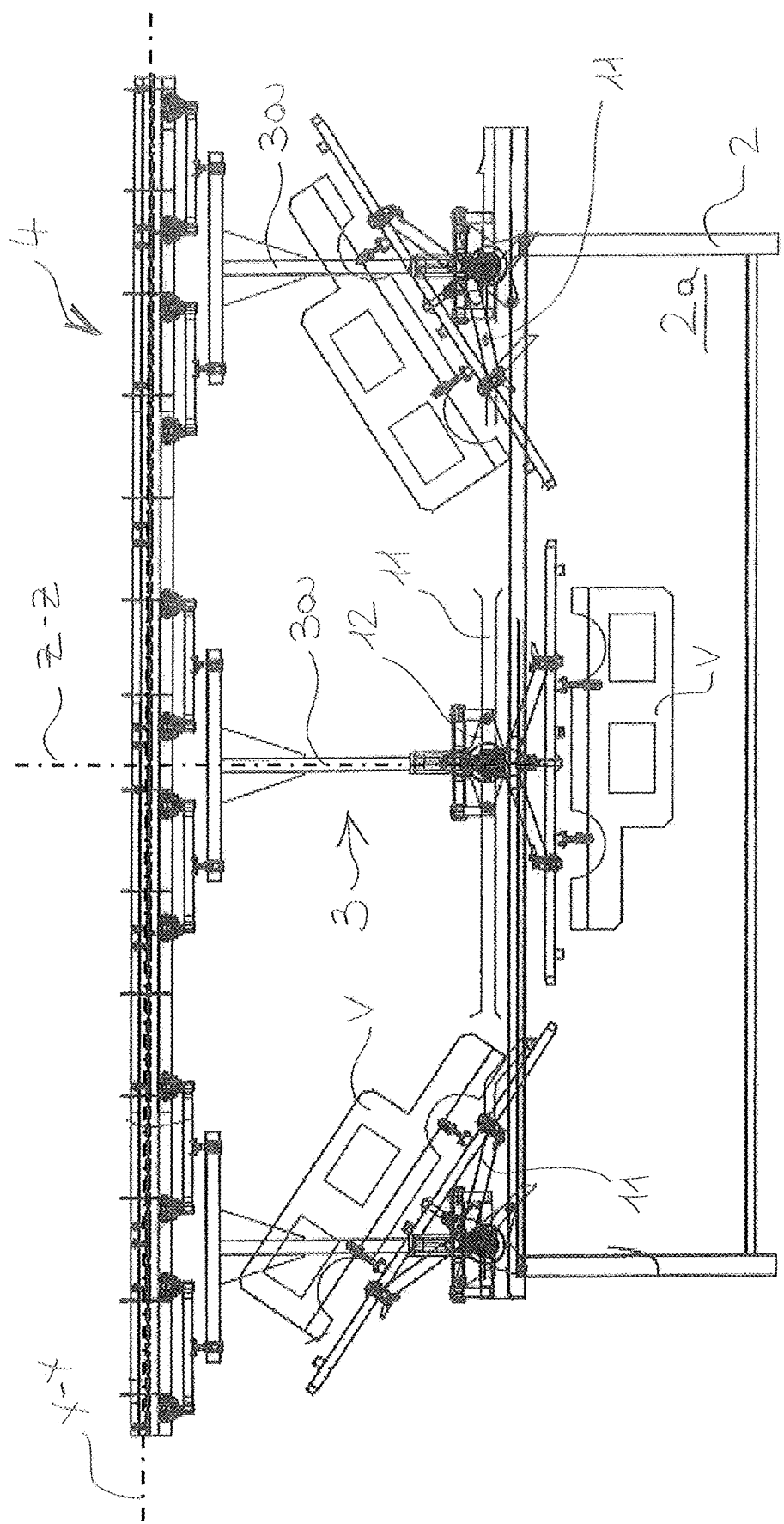
FIG. 7 is a view in partial longitudinal section of the treatment path of the apparatus in FIG. 1 with the position taken by the structure of the vehicles transported with respect to a treatment tank.

With reference to FIGS. 1 to 21, 1 globally indicates an apparatus for the surface treatment of components according to the invention, in particular of an apparatus for treating a structure of the vehicle by means of complete immersion treatments in treatment baths contained in treatment tanks.

The apparatus 1 for the surface treatment of components comprises:

two or more treatment tanks 2, generally also thirteen (it should be noted that, for simplicity of representation, a reduced number of treatment tanks is shown in the attached figures), to contain treatment baths positioned in series with one another to define a path P for treating the structure of a vehicle V;

a plurality of trolleys 3, each trolley 3 of said plurality of trolleys being suitable for hooking, supporting and transporting the structure of a vehicle V to be treated;

first chain drive means 4 for moving said carriages 3 in a forward run along said path P in a longitudinal advancement direction X-X from an upstream station 6 to a downstream station 7 of input and, respectively, of output of said carriages from said treatment path P;

second drive means for moving said carriages (3) in a return run from said downstream station 7 to said upstream station 6.

Hence, said path P is identified from said upstream station 6 of entry to said downstream station 7 of exit of said trolleys with reference to the direction of advance of said trolleys from said upstream station 6 of entry to said downstream station 7 of exit.

Said treatment tanks 2 comprise opposite longitudinal sides 2a and opposite transverse sides (or head ends) 2b, respectively extended longitudinally along said path P and transversely to said path P.

It should be pointed out that the aforementioned path P for treating the structure of the vehicles is also commonly referred to as a tunnel or work tunnel, even in the absence of containment elements suitable for identifying an effective closed tunnel open only at the ends of the head.

The aforementioned trolleys 3 are:

selectively hookable in engagement with said first chain drive means 4 in said upstream station 6 to be moved along said path P in said forward run and are selectively releasable from the association in engagement with said first chain drive means 4, according to the method already known and used previously known Power & Free type apparatuses.

As will be more apparent from the following description, the selective engagement of the trolleys 3 into engagement with the first chain drive means 4 takes place at the upstream station 6. Substantially, when necessary, a trolley loaded with the structure of a vehicle V to be treated is advanced into the input station positioned upstream so as to be engaged by the first chain drive means 4 that are generally always kept in motion according to a closed loop path wherein a forward branch and a return branch are identified between the downstream station 7 and the upstream station 6.

Advantageously, each trolley 3 comprises:

a first portion 3a, which identifies a first part of the trolley, which can be joined integrally in translation with said first chain drive means 4 in a releasable manner and a second portion 3b that identifies a second part of the trolley that, during movement along said path P, is extended in a transverse direction Y-Y to the aforementioned longitudinal direction of travel X-X and connected integrally in rotation to said first portion 3a of the trolley by first hinge means 8.

In view of this, each trolley is selectively and singularly engaged in translation with said first chain drive means 4 when required, i.e. when the trolley has been loaded with the structure of a vehicle V and it is intended to start the treatment cycle of that vehicle structure.

It should be highlighted that:

the aforesaid second portion 3b is the part of the trolley 3 suitable for hooking, supporting and transporting the structure of a vehicle V to be treated and the aforementioned first hinge means 8 allow a rotation of said second portion 3b with respect to said first portion 3a around an axis of transverse rotation extended in said transverse direction Y-Y.

Advantageously, the apparatus 1 comprises opposed support and sliding guides 9 extending axially only along said path P, near, i.e. at a minimum distance, an upper end of said longitudinal sides 2a of said treatment tanks 2 to support and/or guide opposite transverse ends 10 of said trolleys 3.

In accordance with the shown embodiments, the aforementioned support and sliding guides 9 are spaced apart from each other so as to be further away from the longitudinal center line with respect to the longitudinal sides 2a of such treatment tanks 2. In this way, each trolley must be stably supported at its opposite transverse ends, that is to say the opposite ends of the trolley in the transverse direction Y-Y, for the whole section in which it passes in the path P.

Advantageously, the second portion 3b of each trolley 3 comprises an engagement portion 12 that, in the portion of said path P, is engaged with cam-slider-coupling with cam elements 11 arranged along said path P.

During the advancement of a trolley 3 along the path P, the cam-slider engagement that is realized between the aforesaid engagement portion 12 and the cam elements 11 arranged along the said path P is such as to cause a complete revolution of the said trolleys in correspondence with of one or more of said treatment tanks 2 during the advancement of said trolleys 3 along said path P.

In essence, when approaching a treatment tank 2, they take place:

a first 180° overturning (a reversal) around said transverse rotation axis of the second portion 3b of a trolley 3, this overturning being performed in correspondence with an initial section of said treatment tank 2 and a second 180° overturning (a reversal) around said transverse rotation axis of the second portion 3b of a trolley 3, this overturning being performed in correspondence with a final section of said treatment tank 2, also in this case identified with reference to the direction of advance of the trolleys 3 along said path P.

For this purpose, the aforementioned cam elements 11 are provided at the opposite transverse sides 2b of the treatment tanks 2 for which a trolley 3 and the relative vehicle structure V attached and transported must be turned upside down to be completely immersed in the treatment bath contained in said treatment tank 2.

In fact, the overturning of the trolley entering and exiting the treatment tanks 2 allows to contain the longitudinal length of the treatment tanks 2, since it is not necessary to provide inlet and exit ramps at the opposite transverse sides 2*b* of the treatment tanks that identify the opposite inlet ends with reference to the direction of advance of the trolleys 3 along the path P.

Preferably, said cam elements 11 arranged along said path P are shaped to create a desmodromic engagement with said engagement portion 12 second portion 3*b* of a trolley 3.

Preferably, the above cam track 11 are "C" shaped in cross-section.

Preferably, the above cam elements 11 arranged along path P comprises one or more guide rails 11 extended along the whole length of the path P.

It should be pointed out that, as previously described, it is advantageous that the aforementioned opposing support and sliding guides 9 extended along the aforementioned path P are positioned at a minimum distance, preferably just above, from the upper end of the longitudinal sides 2*a* of the treatment tanks 2 in order to ensure complete immersion in the treatment bath contained in the treatment tank 2 of the vehicle structure V transported by the trolleys 3 following, i.e. after, the aforementioned first 180° overturning around said axis of transverse rotation of the second portion 3*b* of a trolleys 3. In fact, this avoids having to implement the presence of additional handling and driving means to lower the height of the vehicles V carried by trolleys 3 at treatment tank 2, such as required by example in the prior art document WO2009/083081.

In accordance with an embodiment (for example, see FIGS. 2, 5, 5*a*, 6, 6*a*, 8, 12, 13, 13*a*, 14, 16, 17, 18 and 18*a*) the aforesaid engagement portion 12 of the second part 3*b* of a trolley 3 comprises a lever having two opposite arms extending one in the other. A middle portion of said lever 12 is connected integrally in rotation with the second part 3*b* of the respective trolley 3, so that a rotation of said lever 12 about an axis of rotation extended in a transverse direction Y-Y causes an equal rotation of said second part 3*b* of the trolley. The free ends I and II of the aforesaid opposite arms of said lever 12 are the elements that identify the sliders suitable for engaging the aforementioned cam elements 11 arranged along said path P, to be guided by them so as to rotate said lever around to the aforesaid axis of rotation extended in said transverse direction Y-Y.

Figure 8:
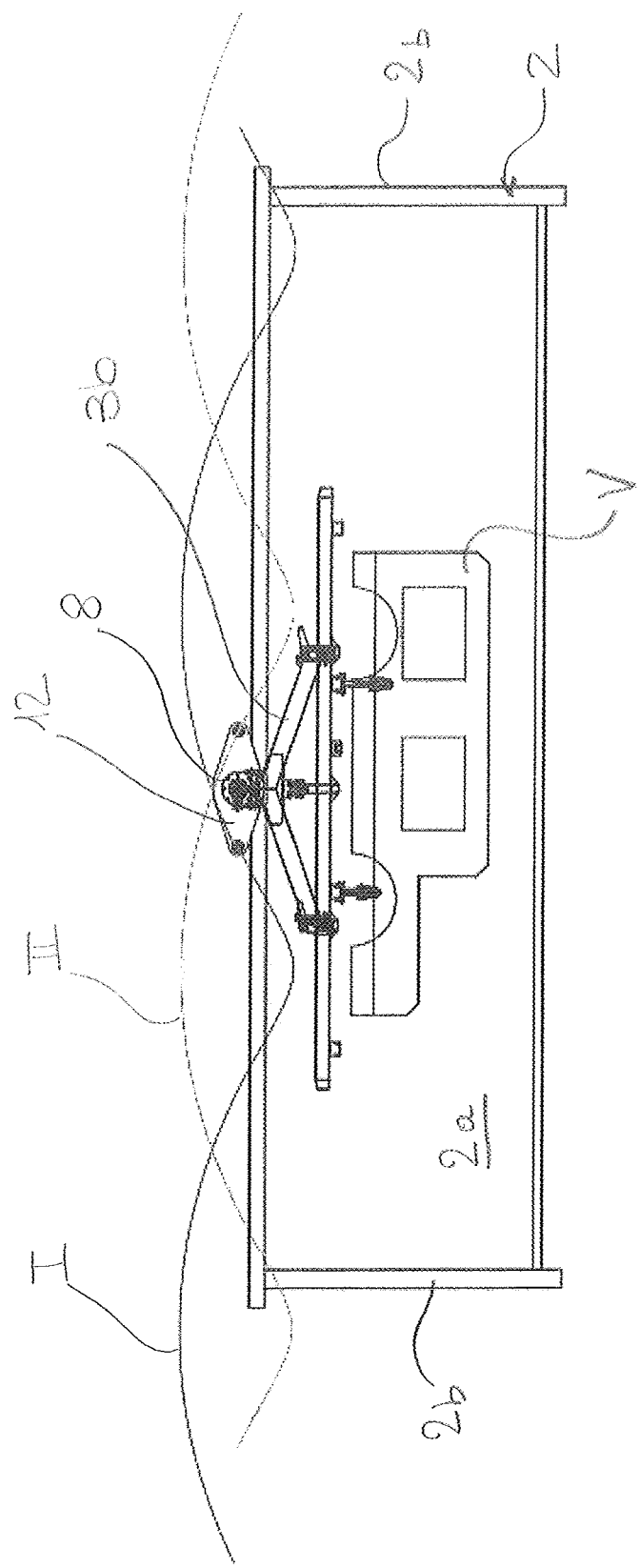
FIG. 8 is a view in partial longitudinal section of the treatment path of the apparatus in FIG. 1 with a vehicle structure carried in an inverted position inside a treatment tank and with indication of the trajectories of movement followed by the free ends of the two arms of the lever in FIGS. 5a and 6a following the interaction with cam elements.
Figures 9, 9A:
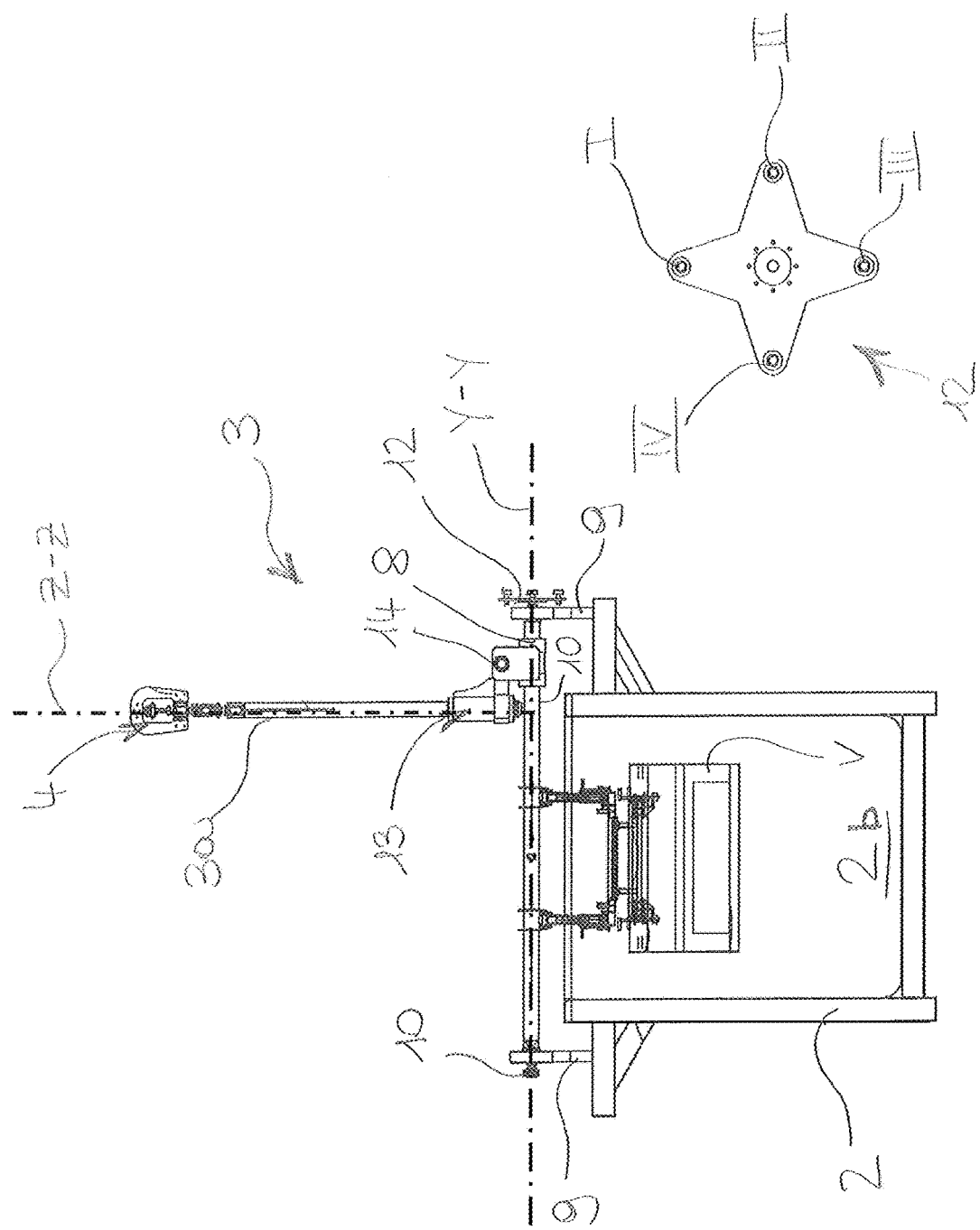
FIG. 9 is a view in partial cross-section of the treatment path of the apparatus in FIG. 1 with a vehicle structure carried in an inverted position inside a treatment tank.
FIG. 9a is a plan view of a detail of a cross with four arms in FIG. 9.

In FIG. 8 the curves I and II constitute the representation of the points reached by the ends I and II respectively during the advancement along the path P in correspondence of a treatment tank 2 and, as described, determine a complete revolution of the second part 3*a* of the trolley 3 around to the transverse rotation axis Y-Y.

Figure 10:
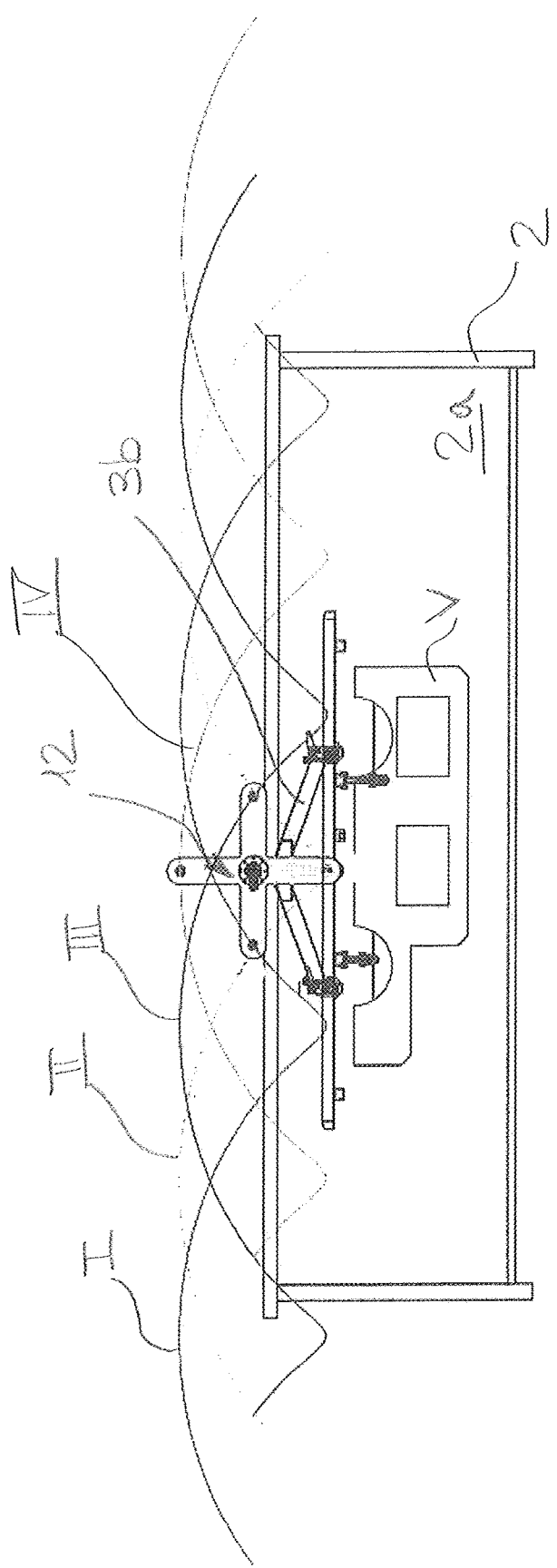
FIG. 10 is a view in partial longitudinal section of the treatment path of the apparatus in FIG. 1 with a vehicle structure carried in an inverted position inside a treatment tank and with indication of the trajectories of movement followed by the free ends of the arms of the cross in FIG. 9a following the interaction with cam elements.
Figure 11:
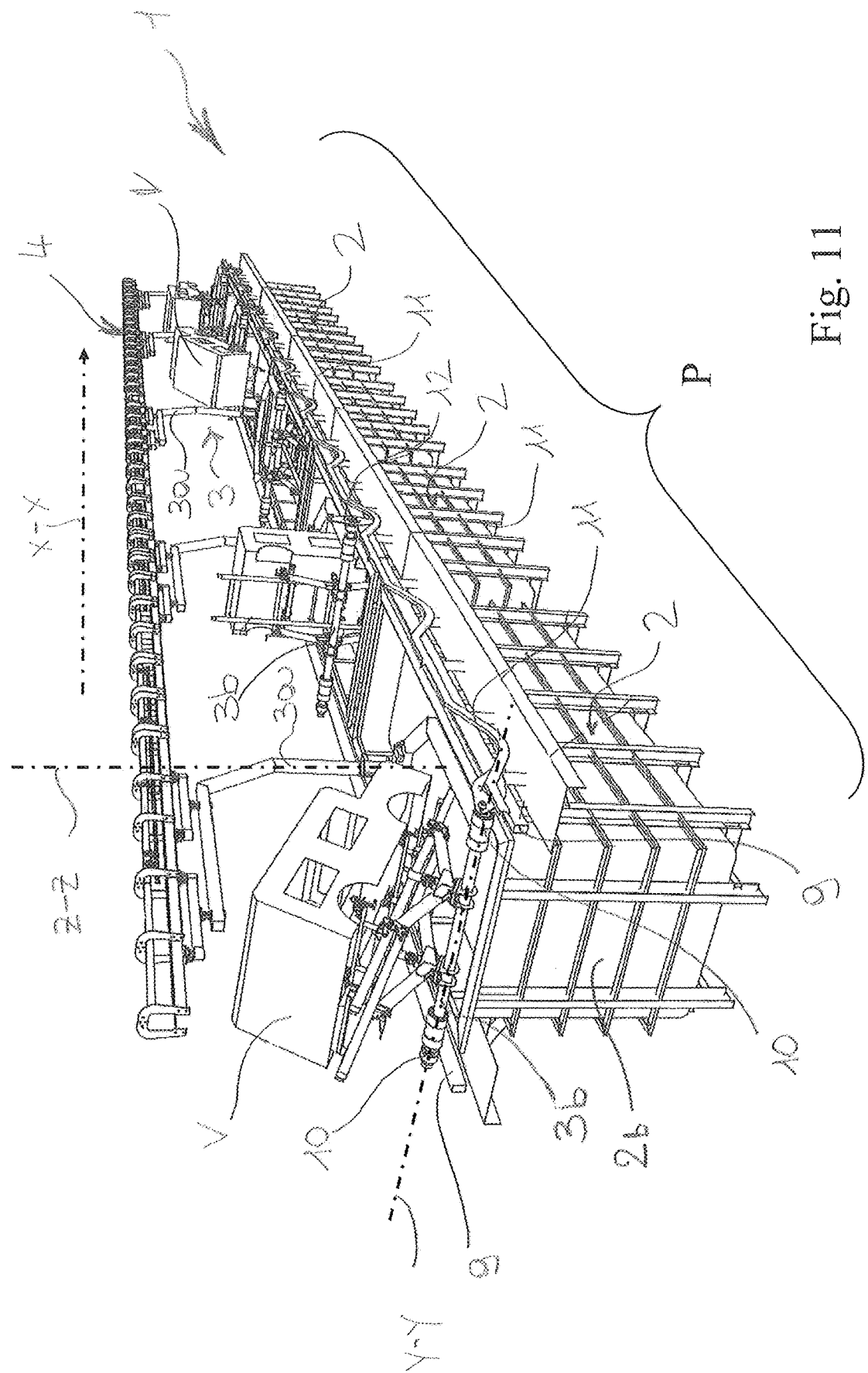
FIG. 11 shows a simplified perspective view of a portion of the treatment path of an apparatus according to the invention in accordance with a second embodiment.
Figure 12:
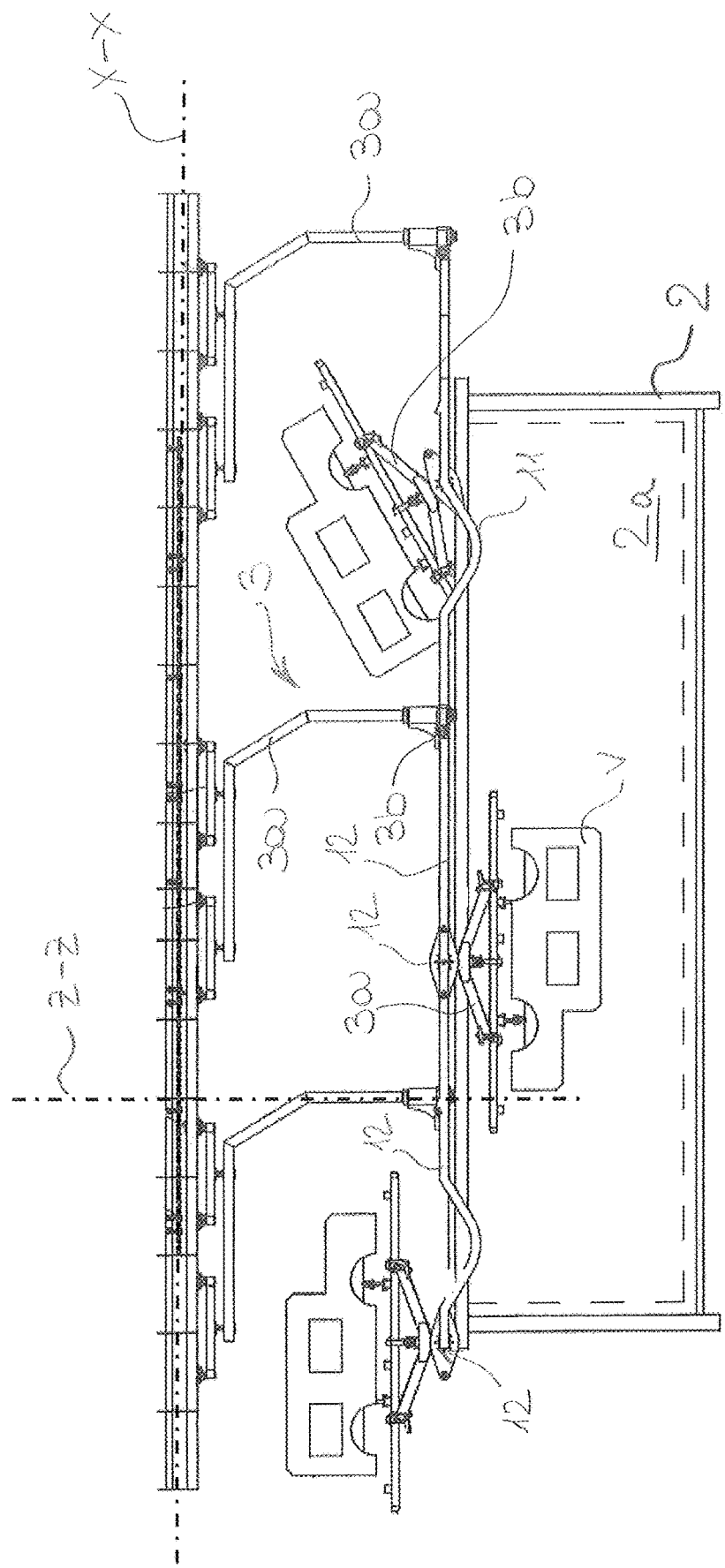
FIG. 12 is a view in partial longitudinal section of the treatment path of the apparatus in FIG. 11 with the position taken by the structure of the vehicles transported with respect to a treatment tank.
Figures 13, 13A:
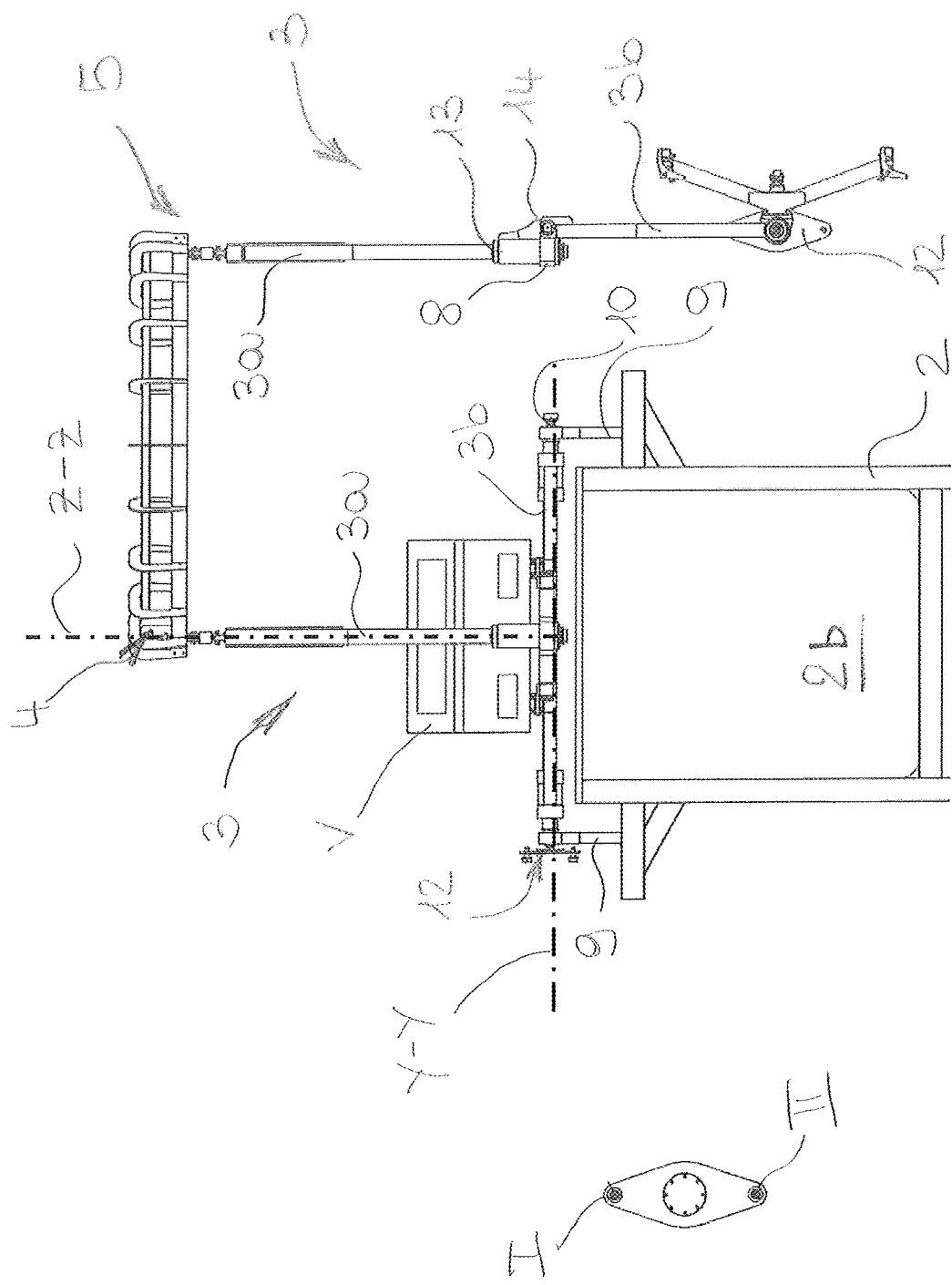
FIG. 13 is a transversal plan view of the treatment path of the apparatus in FIG. 1 with a vehicle structure carried in a higher position with respect to the height of the treatment tanks.
FIG. 13a is a plan view of the detail of a lever with two arms in FIG. 13.
Figure 14:
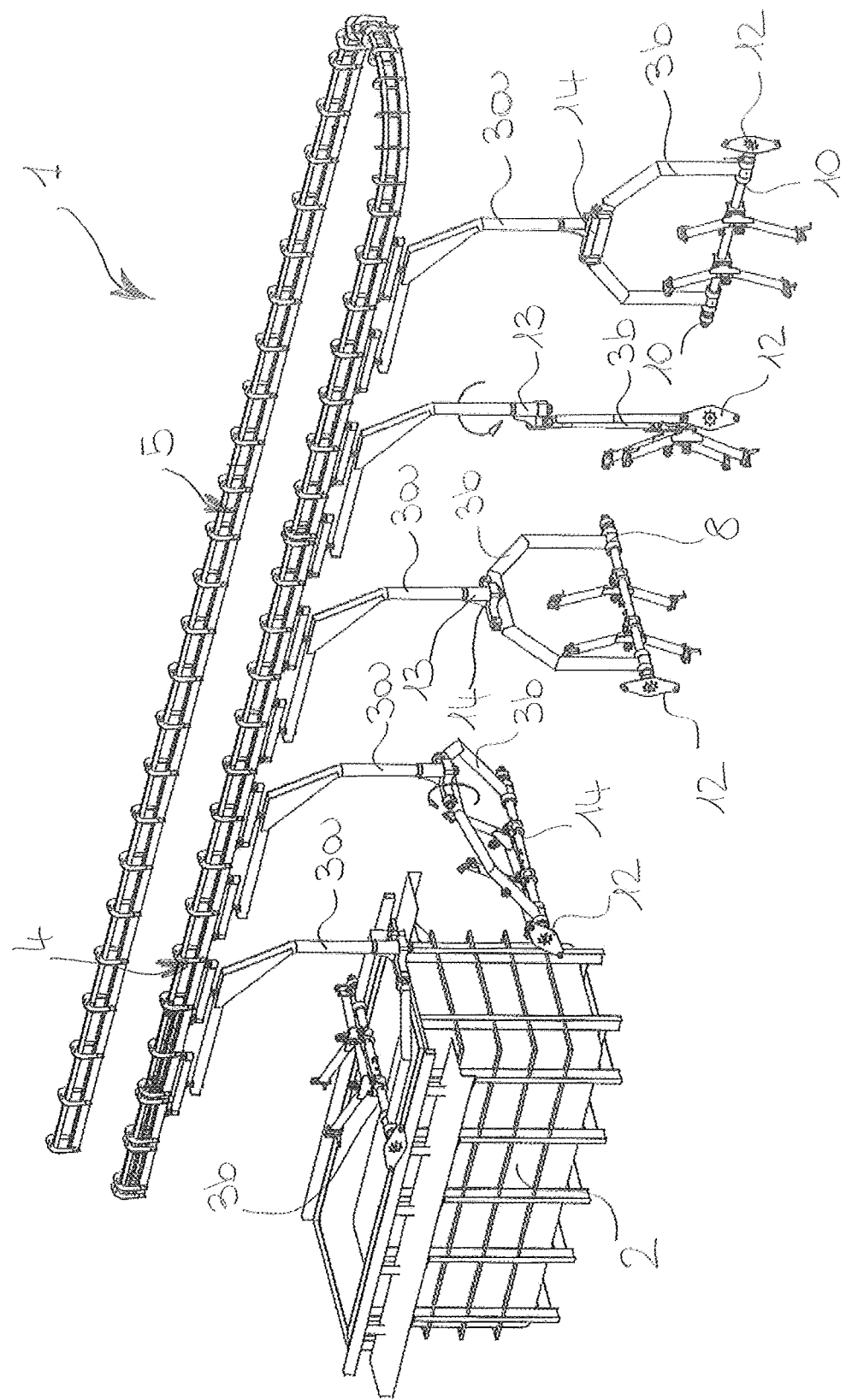
FIG. 14 is a simplified perspective view of a detail of the apparatus in FIG. 11 with the horizontal to vertical movement of the trolleys at the exit of the treatment path after the unloading of the structure of transported vehicles.
Figure 15:
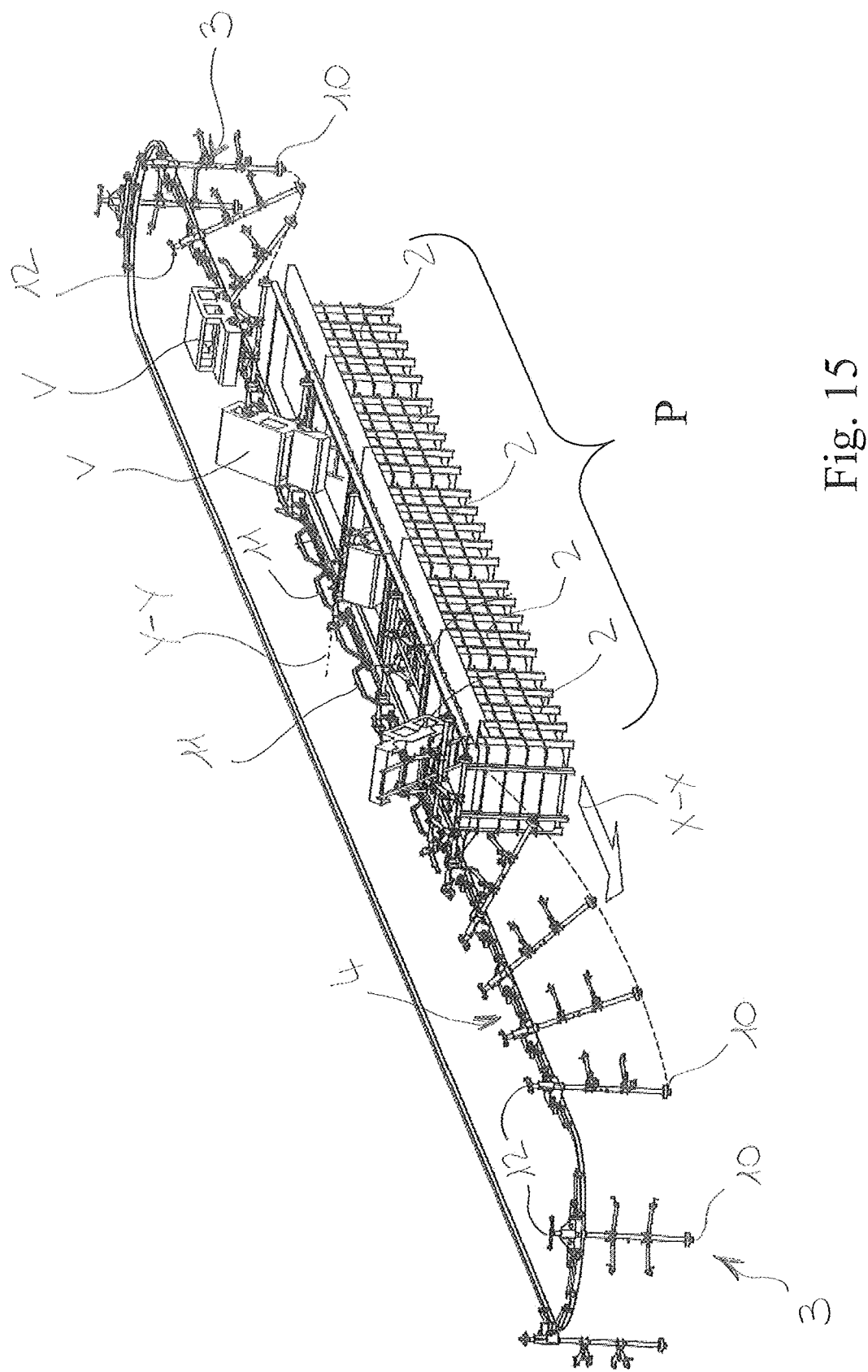
FIG. 15 is a simplified perspective view of an apparatus according to the invention in accordance with a third embodiment.
Figure 16:
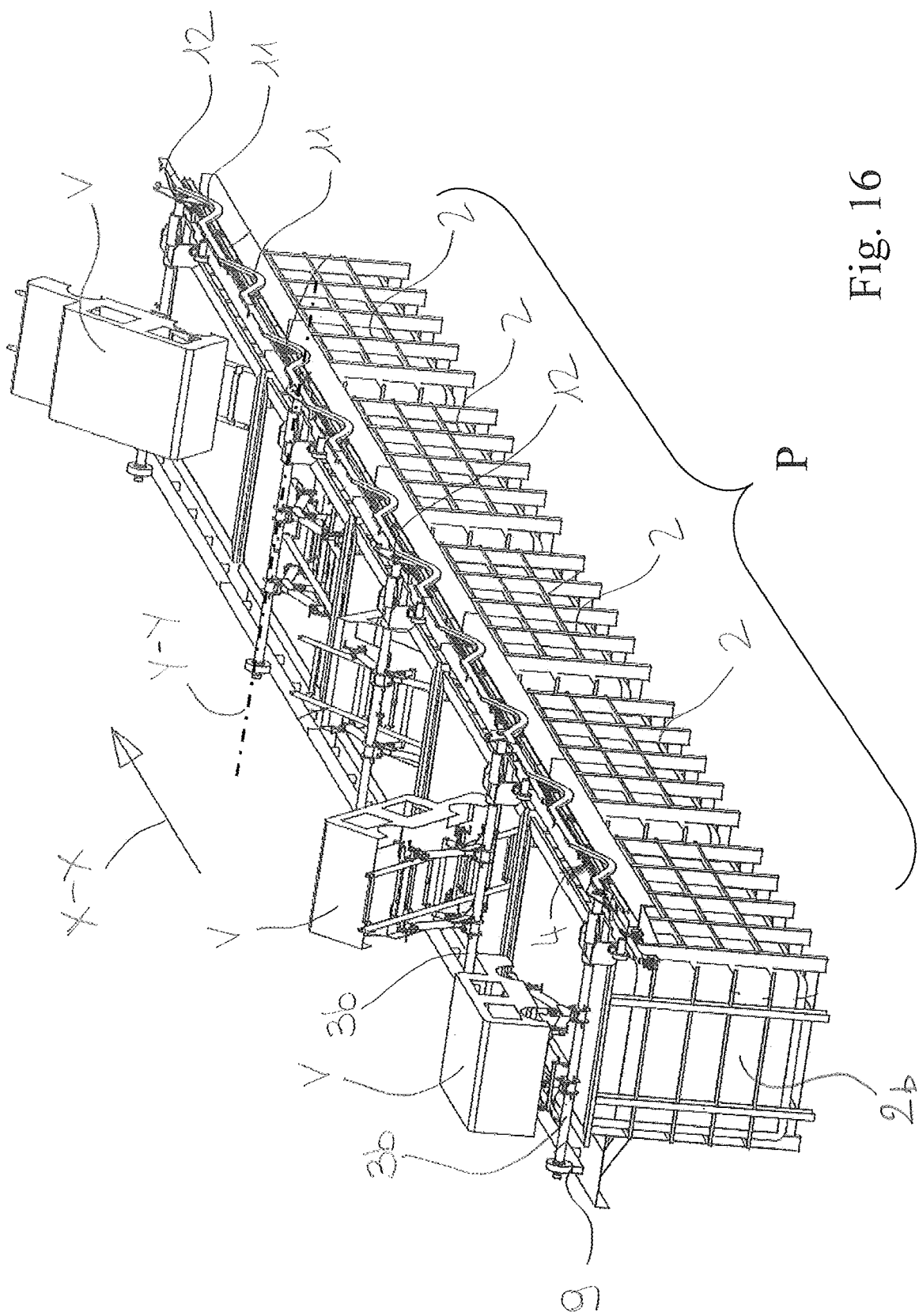
FIG. 16 is a distinct perspective view of a portion of the treatment path of the apparatus in FIG. 15.
Figure 17:
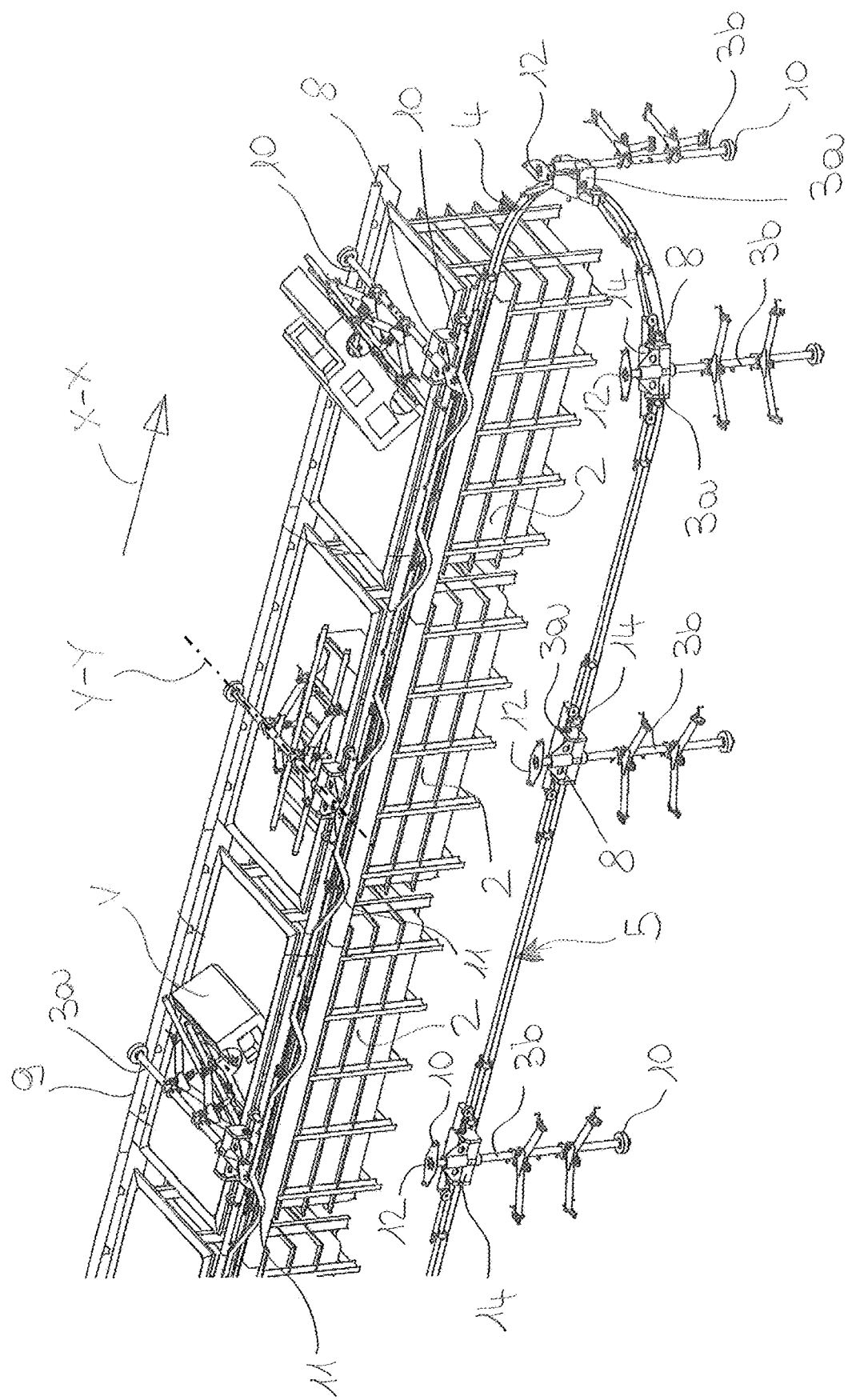
FIG. 17 is a simplified perspective view of a detail of the apparatus in FIG. 15 with the horizontal to vertical movement of the trolleys at the exit of the treatment path after the unloading of the structure of transported vehicles.
Figures 18, 18A:
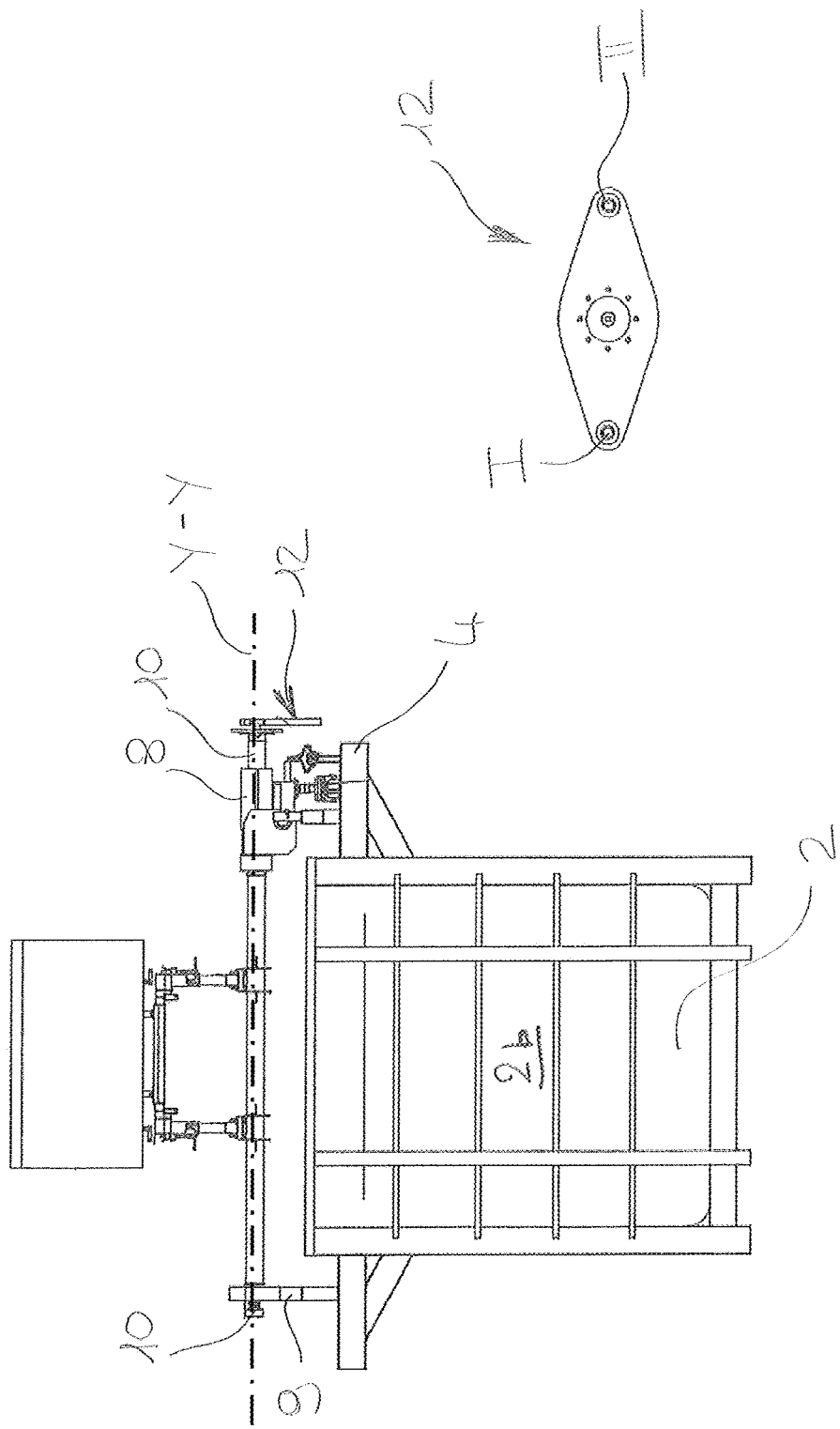
FIG. 18 is a transversal plan view of the treatment path of the apparatus in FIG. 15 with a vehicle structure carried in a higher position with respect to the height of the treatment tanks.
FIG. 18a is a plan view of the detail of a lever with two arms in FIG. 18.
Figure 19:
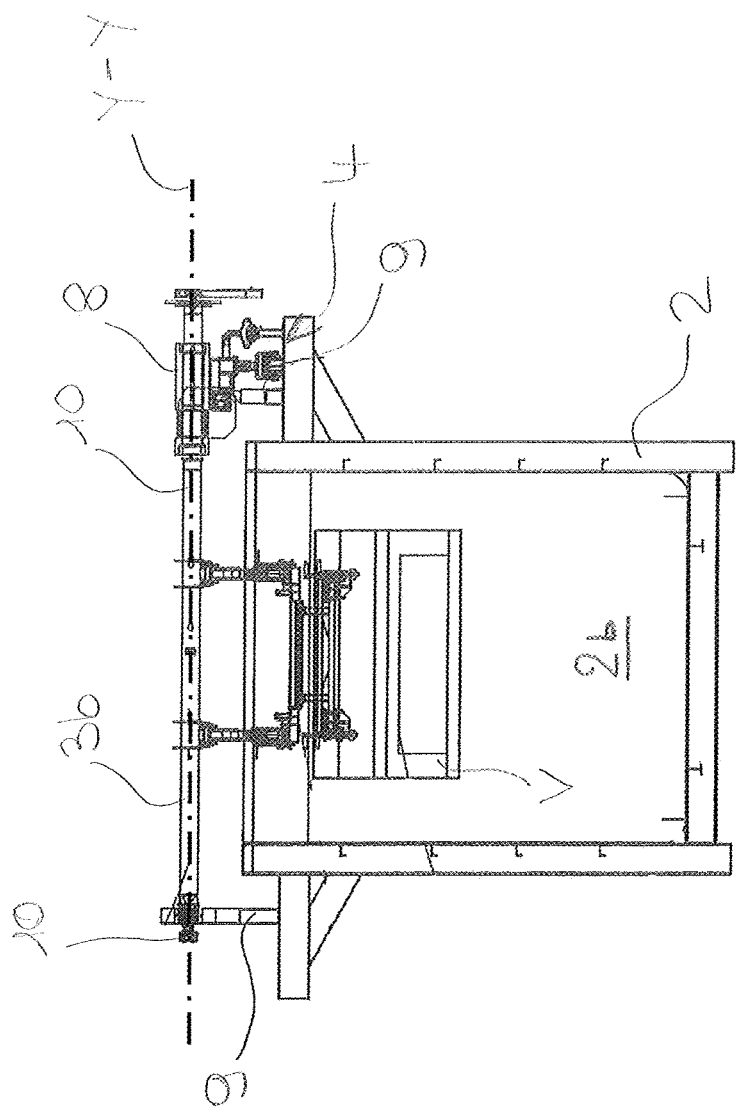
FIG. 19 is a view in partial cross-section of the treatment path of the apparatus in FIG. 15 with a vehicle structure carried in an inverted position inside a treatment tank.
Figure 20:
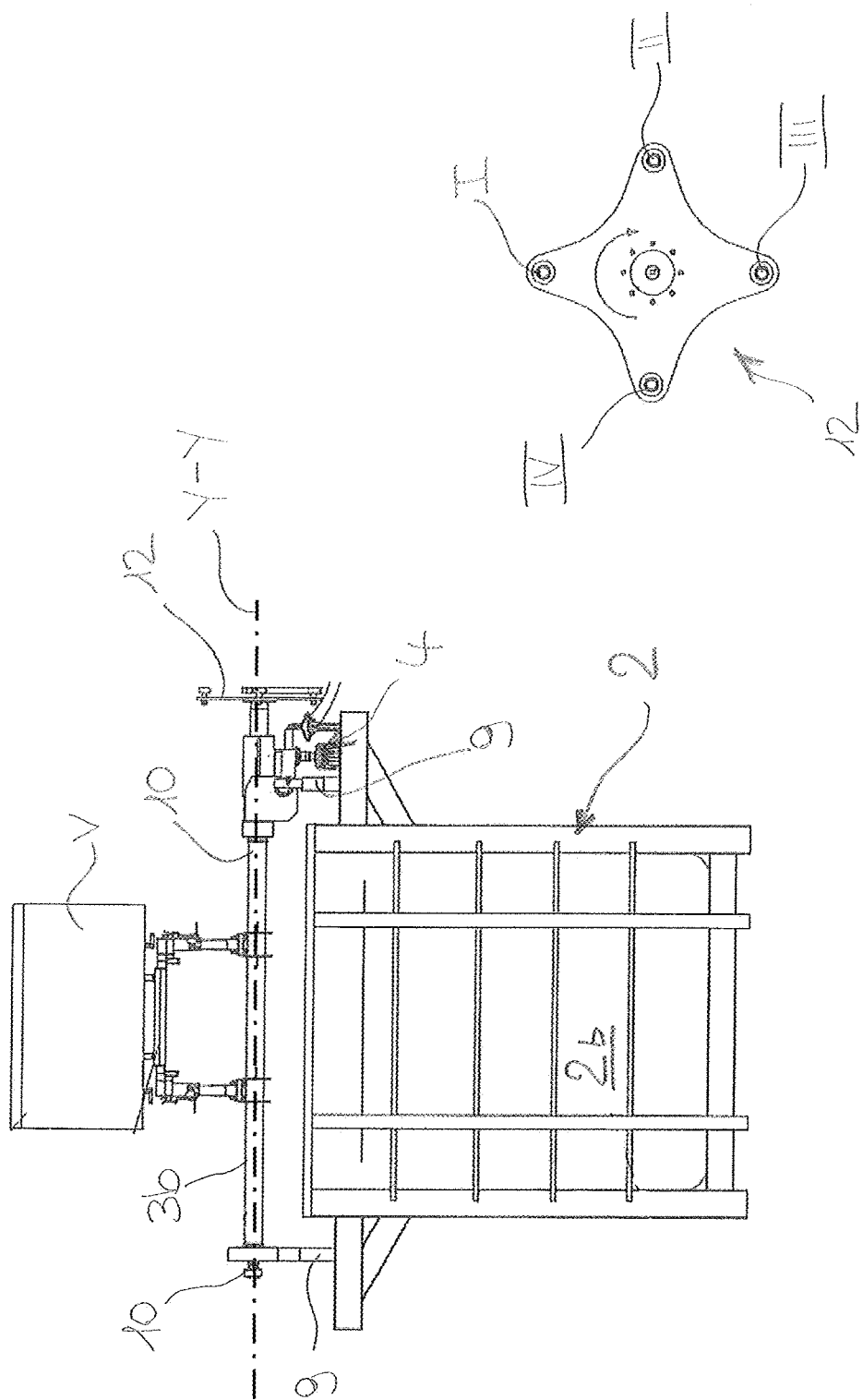
FIG. 20 is a partial cross-sectional view of the treatment path of the apparatus in FIG. 15 with a vehicle structure carried in a higher position with respect to the height of the treatment tanks.
Figure 21:
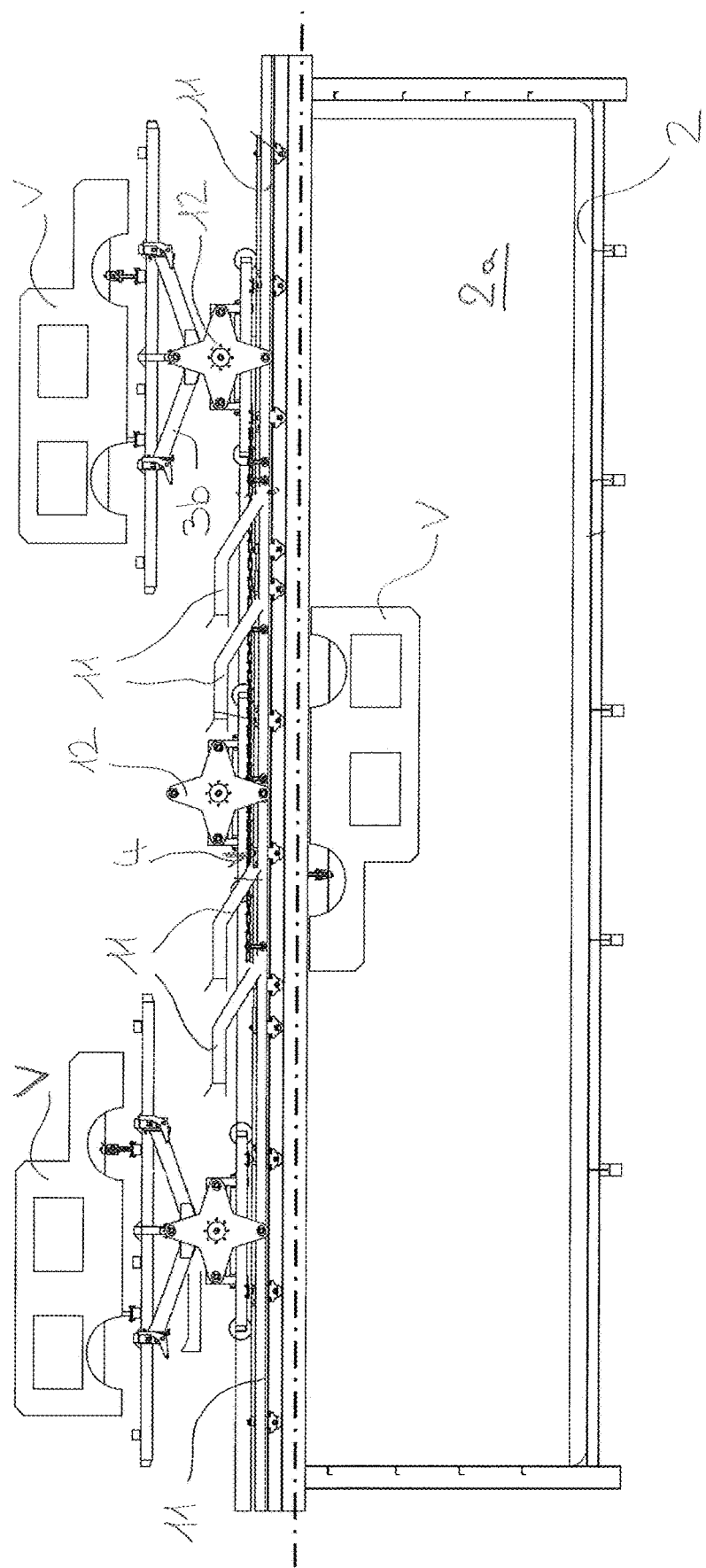
FIG. 21 is a view in partial longitudinal section of the treatment path of the apparatus in FIG. 15, in the version with the four-arm cross in FIGS. 20 and 20a, with the position taken by the structure of the vehicles carried with respect to a treatment tank.

In accordance with an embodiment (for example, see FIGS. 9, 9*a*, 10, 20, 20*a*, 21) the aforesaid engagement portion 12 of the second part 3*b* of a trolley 3 comprises a four-arm cross, a central portion of that is connected integrally in rotation with the second part 3*b* of the respective trolley 3, so that a rotation about an axis of rotation extended in the transverse direction Y-Y causes an equal rotation of said second part 3*b* of the trolley. The free ends I, II, III, and IV of the aforementioned four arms of said cross 12 are the elements that identify the sliders suitable for engaging the aforementioned cam elements 11 arranged along said path P, to be guided by them so as to place rotating said lever around the aforementioned axis of rotation extended in said transverse direction Y-Y. In FIG. 10 the curves I, II, III and IV constitute the representation of the points traveled by the ends I, II, III and IV respectively during the advancement along the path P in correspondence of a treatment tank 2 and, as described, determine a complete revolution of the second part 3*a* of the trolley 3 about the transverse rotation axis Y-Y.

Preferably, the free ends I and II or I, II, III and IV of said arms of the lever 12 or of the cross 12 provide for the presence of revolving means to cause a rotation without sliding of said free ends with the aforementioned cam elements 11.

It should be noted that having the engagement portion 12 of the second part 3*b* of the trolley 3 shaped like a lever or cross (as described above) depends on the specific requirements to be met, both of these embodiments being implementable in the three different embodiments described below.

According to a first embodiment (see FIGS. 1 to 7 and 9) the aforesaid first chain drive means 4 extend:
along said path P,
at a higher level than the maximum height reached by said sides 2*a*, 2*b* of said treatment tanks 2 and
in a lateral position with respect to the longitudinal center line of said treatment tanks 2, preferably in a lateral position or at most aligned with respect to the vertical line passing through the longitudinal sides 2*a* of said treatment tanks 2.

According to this first embodiment, the first portion 3*a* of said trolley 3 comprises an arm that extends downwards from the first chain drive means 4 to said second portion 3*b* of said trolley 3, preferably up to one of the two opposite transverse end ends of said first portion 3*a*.

According to a second embodiment (see FIGS. 11 to 14), the aforementioned first chain drive means 4 extend:
along said path P,
at a higher level than the maximum height reached by said sides 2*a*, 2*b* of said treatment tanks 2 and
in a position substantially aligned with the longitudinal center line of said treatment tanks 2 or at the most offset of a distance such as not to exceed the vertical line passing through the longitudinal sides 2*a* of said treatment tanks 2.

In this third embodiment, said first portion 3*a* of said trolley 3 comprises an arm that extends transversely and downwards from said first chain drive means 4 to said second portion 3*b* of said trolley 3.

According to a third embodiment (see FIGS. 15 to 21), the aforementioned first chain drive means 4 extend:
along said path P,
at a height substantially corresponding to the height of said opposing support and sliding guides (9) and
in a lateral position that, with respect to the longitudinal center line of said treatment tanks 2, is more external or more aligned with respect to the vertical line passing through the longitudinal sides 2*a* of said treatment tanks 2.

In accordance with this second embodiment, said first portion 3*a* of each trolley 3 comprises an arm that extends from said first chain drive means 4 to said second portion 3*b* of said trolley 3.

Preferably, the aforementioned first chain drive means 4 comprise a single chain adapted to selectively engage portions of the said first trolleys 3 to move them along the said first branch of the said path.

In accordance with the shown embodiments, the aforesaid second driving means for moving the trolleys 3 in the return travel from the downstream station 7 to the upstream station 6 comprise the return branch of the aforementioned first chain drive means 4 that extends from the downstream station 7 to the upstream station 6.

Alternatively, according to an embodiment not shown, it is possible to provide the presence of distinct second drive means for moving the trolleys 3 in the return run from said downstream station 7 to said upstream station 6, for example, providing for the presence of a friction conveyor or other means of transport. This alternative embodiment is useful if the return branch of the aforementioned first chain drive means 4 is to be optimized, so as to limit the overall dimensions of the apparatus, being it clear that for such a purpose it is not always possible to achieve also entrusting to the chain drive means 4 the task of returning the trucks 3 from the downstream station 7 to the upstream station 6.

According to a preferred embodiment of the apparatus 1 according to the invention, the aforementioned first portion 3a of the trolleys 3 comprises:
an arm along which they are positioned:
second hinge means 13 to allow rotation about a vertical axis Z-Z of a portion of said arm downstream of said second hinge means 13) with respect to a portion of said arm closest to said first means chain drive 4 and/or
third hinge means 14 to allow a rotation with respect to a horizontal axis of a portion of said arm downstream of said third hinge means 14 with respect to a portion of said upstream arm closest to said first chain drive means 4,
as well as mechanical means (for example, linear actuators or cylinder-piston assemblies and the like) to cause rotation of said portions of said arm of each trolley around said vertical axis Z-Z and/or said horizontal axis in the vicinity or at the exit from said station downstream and in proximity to or at the inlet of said upstream station, so as to allow a movement of said trolleys 3 along said return path in a rotated smaller configuration.

Thus, the apparatus according to this invention provides a single chain transport system, which can be lateral (right or left) or central with respect to the treatment tanks, in a low, medium or high position with respect to the upper end of the treatment tanks, for the movement of trolleys having an axis of rotation transversal to the direction of travel along the treatment path and, preferably, an axis of rotation longitudinal to the direction of advancement of the trolley itself to allow the input of the treatment path and the output from it the rotation respectively from vertical horizontal and horizontal to vertical of the second portion of the trolleys with respect to the first portion.

In the vicinity of the upstream station 6 of the treatment path P, each trolley, thanks to a drive (mechanical, electric or pneumatic) of the aforesaid mechanical means, is moved so as to bring its own axis of rotation from a vertical smaller position (in which it is moved in the return run as shown, for example, in FIGS. 1, 13, 14, 15 and 17) to a horizontal position transversal to the direction of advancement wherein the trolley is ready to be loaded with a vehicle structure V first to be started along the aforementioned path P supported by the opposing support and sliding guides 9. Once this configuration has been reached, the trolley is inserted in line along the aforementioned treatment path P after having been loaded with the frame structure of the vehicle V to be treated.

In the loading area of the vehicle structures V on the trolleys 3, each vehicle structure V can be advantageously fixed directly to the respective trolley 3. For this purpose, the vehicle structure V is arranged in a per se known manner with suitable holes suitable for being engaged by eccentrics with which the trolleys 3 are provided. The insertion of these eccentrics in the aforesaid holes allowing each vehicle structure (V) to be rigidly locked to a respective trolley 3.

Alternatively, the structure of the vehicles V to be treated may already be fixed on the movement skids that are in turn hooked and secured to a respective trolley 3. Similarly, upon leaving the treatment path P each trolley will leave the respective vehicle structure P transported in the unloading area identified by the downstream station 7, to be subsequently rotated in the aforementioned lower vertical position mentioned above.

In accordance with all the embodiments described above, guide rails 11 extend along the entire length of said path P, even above tanks 2.

Differently, in accordance with an alternative form of construction referring to all three embodiments described above, it is possible that the guide rails 11 are interrupted at certain longitudinal sections of said path P above tanks 2 as described in the following with reference to FIGS. 22 and 23.

Figure 22:
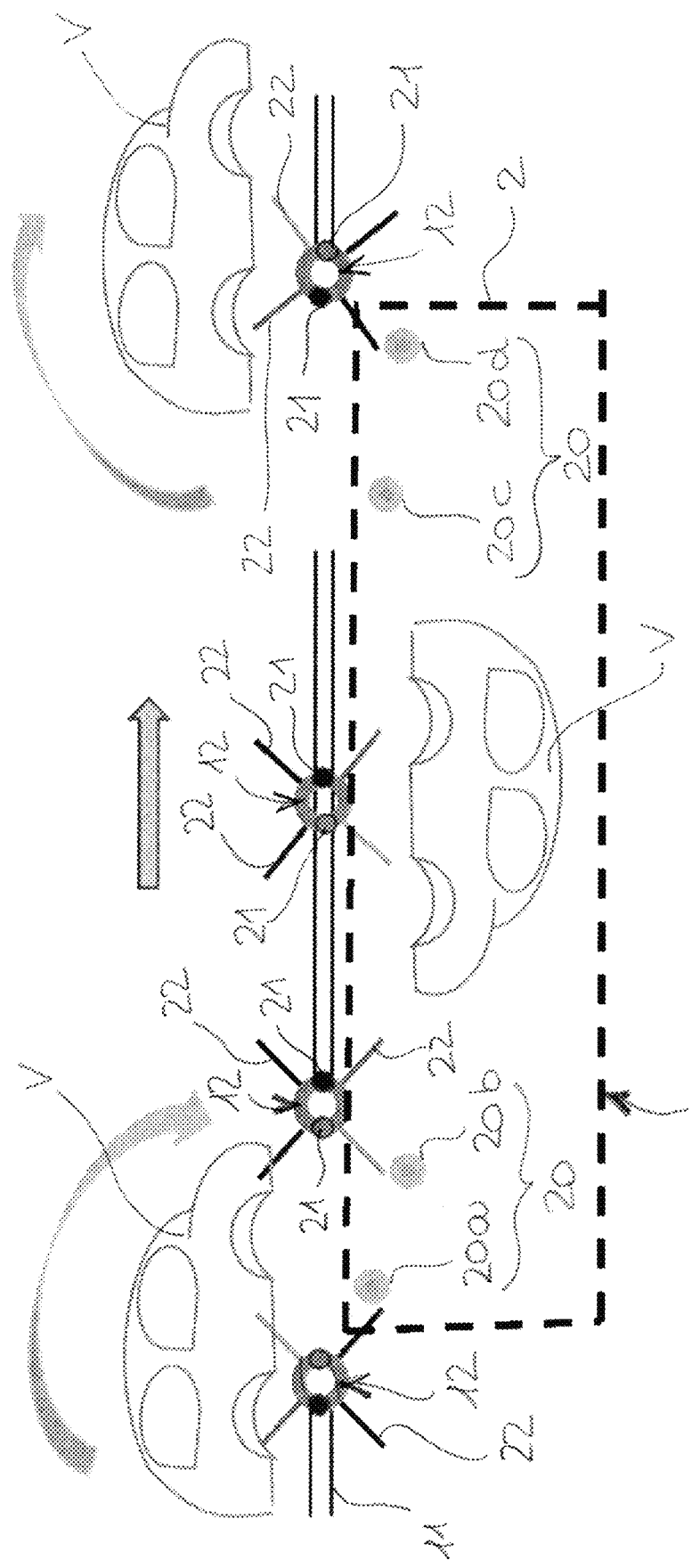
FIG. 22 is a schematic and simplified longitudinal view of a portion of an apparatus according to the invention in accordance with a fourth form of implementation corresponding to a version of the aforementioned third embodiment.
Figure 23:
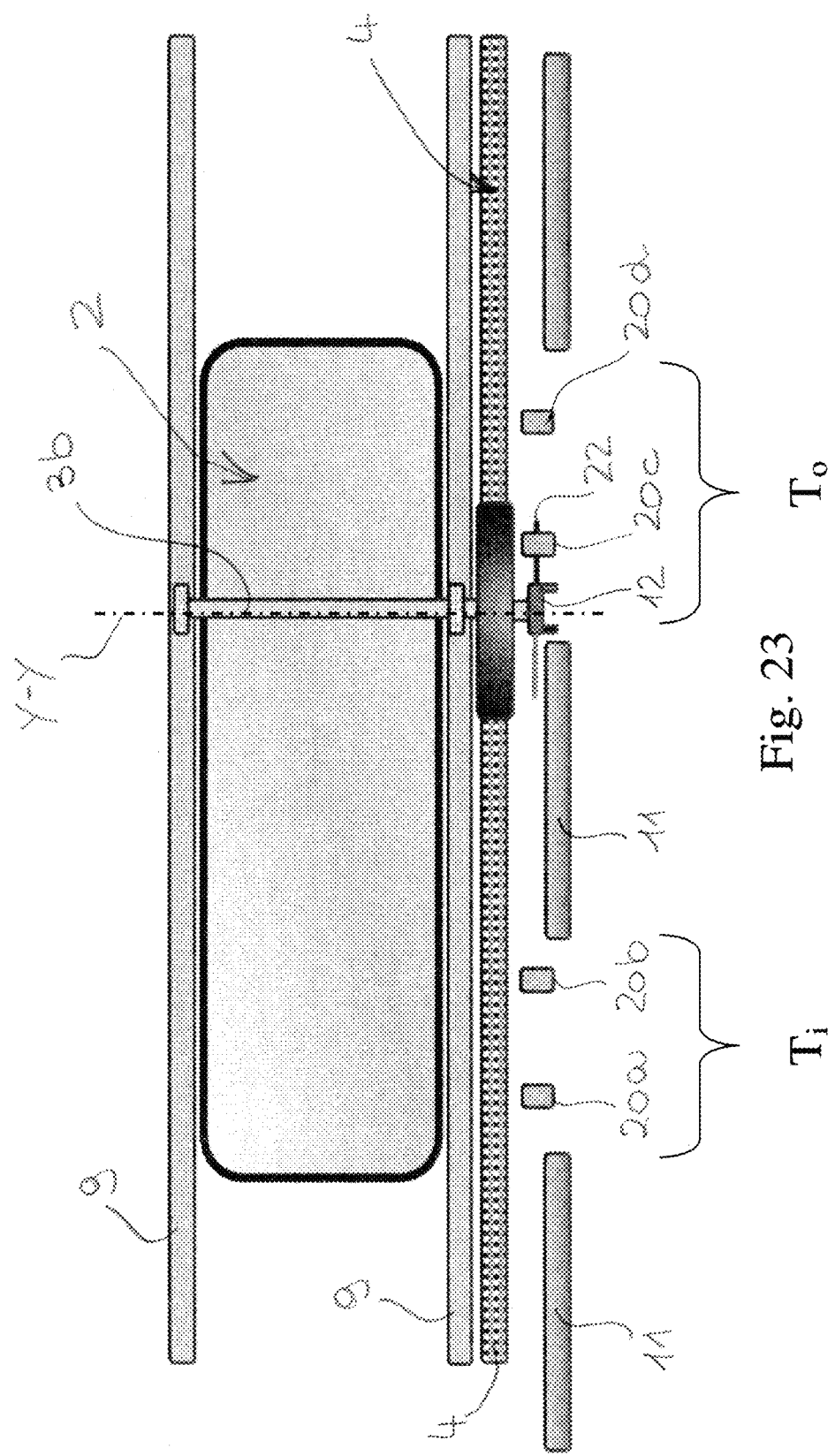
FIG. 23 is a schematic and simplified plan view of FIG. 22.

It should be noted that FIGS. 22 and 23 show an alternative to the third embodiments illustrated in FIGS. 11 to 14, but the same considerations also apply to the other two embodiments described above as far as the feature of guide tracks 11 to be interrupted at certain longitudinal sections of the P path and other elements described below.

Hence, with specific reference to the embodiment illustrated in FIGS. 22 and 23:
the aforementioned one or more guide rails 11 are interrupted at a longitudinal inlet section $T_i$ and at a longitudinal exit section $T_o$ of each treatment tank 2 starting from said transverse sides 2b and, at the same time
at said longitudinal inlet section $T_i$ and at said longitudinal exit section $T_o$ of each tank 2, said cam elements 11 comprise discontinuous stop elements 20 positioned to interfere with said part 12 of said second part 3b of said trolleys 3 and to determine said complete revolution around said transverse rotation axis extended in said transverse direction Y-Y of said trolleys at each treatment tank 2 during forward run of said trolleys 3 along said path P.

Preferably, the above mentioned discontinuous stop elements 20 comprise rolling rollers 20a, 20b, 20c, 20d supported in fixed position along said path P in such a way that they can rotate around a respective axis of rotation extended in said transverse direction Y-Y.

Preferably, for each treatment tank 2 said apparatus 1 comprises:
at said longitudinal inlet section $T_i$ a first stop element 20a positioned at a lower height than the height of the rail 11 and a second stop element 20b positioned at a lower height than the height of said first stop element 20a and longitudinally closer to the middle portion of the treatment tank 2 than said first stop element 20a;
at said longitudinal exit section $T_o$ a third 20c stop element 20c positioned at a lower than the height of said rail 11 and a fourth stop element 20d positioned at a height between the height of said third stop element 20c and the height of said rails 11 and longitudinally more away from the middle portion of the treatment tank 2 than said third stop element 20c.

Said first stop element 20a and said second stop element 20b determine a 180° overturning around said transverse rotation axis extended in said transverse direction Y-Y of said trolleys 3 at said longitudinal inlet section Ti, while said third stop element 20c and said fourth stop element 20d determine a second and subsequent 180° overturning around said transverse rotation axis extended in said transverse direction Y-Y of said trolleys 3 at said longitudinal exit section To.

Preferably, the said engagement portion 12 of the second part 3b of said trolleys 3 shall include:
- a median portion 21 suitable for desmodromic engagement with the guide rails 11 and
- lever arms 22, preferably lever arms of a four-arm cross, suitable to interfere with said discontinuous stop elements 20 during the forward run of each trolley 3 along said path P, to determine said trolley overturning at each longitudinal inlet section Ti and at each longitudinal exit section To of each treatment tank 3.

Preferably, the said middle portion 21 of said engagement portion 12 shall comprises two rolling rollers 22a, 22b supported by said engagement portion 12 so as to be able to rotate around an axis of rotation extended in said transverse direction Y-Y, said two rolling rollers 22a, 22b being suitable to engage said guide rails 11 in two points staggered longitudinally between them.

As can be appreciated from what has been described, the apparatus according to this invention for surface treatment of components, in particular, for treating the structure of a vehicle by complete immersion in treatment baths contained in treatment tanks, makes it possible to meet the aforesaid requirement and to overcome at the same time with the drawbacks referred to in the introductory part of this description with reference to the prior art.

In fact, by means of the apparatus according to this invention it is possible to minimize the longitudinal extension of the treatment tanks that house the treatment baths of the vehicle structures and, at the same time, move the vehicles' transport trolleys only when the latter are actually transporting a vehicle structure to be treated.

Another advantage of the apparatus according to this invention lies in the stable transverse support secured to the trolleys by the opposing support and sliding guides along the entire treatment path, this stable support allowing to be able to rotate/overturn in a safe and stable manner the trolleys and the bodies attached to them at the treatment tanks.

A still further advantage of the apparatus according to this invention lies in the unusual structural simplicity suitable for ensuring good operation over time, easy maintenance and a low manufacturing cost.

Obviously, a person skilled in the art, in order to meet contingent and specific needs, will be able to make a number of changes and variations to the apparatus according to the invention described above, all however contained in the scope of protection of the invention as defined by the following claims.

The invention claimed is:

1. An apparatus for surface treatment of components, in particular for treating the structure of a vehicle by complete immersion in treatment baths contained in treatment tanks, said apparatus comprising:
   - two or more treatment tanks for containing treatment baths positioned in series with one another along a path for treating the structure of a vehicle, said treatment tanks comprise opposite longitudinal sides and opposite transverse sides, respectively extending longitudinally along said path and transversely to said path;
   - a plurality of trolleys, each trolley of said plurality of trolleys being suitable for hooking, supporting and transporting the structure of a vehicle to be treated;
   - first chain drive means for moving said trolleys in a forward run along said path in a longitudinal advancement direction from an upstream station to a downstream station of input and, respectively, of output of said trolleys from said treatment path;
   - second drive means for moving said trolleys in a return run from said downstream station to said upstream station, wherein said trolleys are:
   - selectively hookable in engagement with said first chain drive means in said upstream station to be moved along said path in said forward run, and
   - are selectively releasable from the association in engagement with said first chain drive means, wherein
   said trolleys comprise:
   - a first portion engageable integrally in translation with said first chain drive means in a releasable manner, and
   - a second portion that, during the movement of the trolley along said path, extends in a transverse direction to said longitudinal advancement direction and is connected integrally in rotation to said first portion of said trolleys by means of first hinge means able to allow a rotation of said second portion with respect to said first portion around an axis of transverse rotation extending in said transverse direction, said second portion of said trolleys being a part suitable for hooking, supporting and transporting the structure of a vehicle to be treated, the apparatus comprises opposite support and sliding guides extending axially along said path near an upper end of said longitudinal sides of said treatment tanks to support and/or guide opposite transverse ends of said trolleys, and said second portion of said trolleys comprises an engagement portion that, when in said path, is engaged with cam-slider-coupling with cam elements arranged along said path to bring about a complete revolution around said transverse rotation axis extended in said transverse direction of said trolleys in correspondence with one or more of said treatment tanks during the advancement of said trolleys along said path, an overturning of said second portion of a trolley causing a complete immersion in the treatment bath of an underlying treatment tank of the structure of a vehicle hooked, supported and transported by said second portion of said trolley.

2. The apparatus according to claim 1, wherein:
   said first chain drive means extend:
   - along said path,
   - at a higher level than the maximum height reached by said longitudinal and said transverse sides of said treatment tanks, and
   - in a lateral position with respect to the longitudinal center line of said treatment tanks;
   in each trolley said first portion of said trolley comprises an arm that extends from said first chain drive means downwards to said second portion of said trolley.

3. The apparatus according to claim 2, wherein said first chain drive means are positioned with respect to the longitudinal center line of said treatment tanks in a more external position or at the most aligned with respect to the vertical line passing through the longitudinal sides of said treatment tanks.

4. The apparatus according to claim 1, wherein:
   said first chain drive means extend:
   - along said path,
   - at a height substantially corresponding to the height of said opposing support and sliding guides and
   - in a lateral position that, with respect to the longitudinal center line of said treatment tanks, is more external or more aligned with respect to the vertical line passing through the longitudinal sides of said treatment tanks and in each trolley said first portion of said trolley comprises an arm that extends downwards from said first chain drive means to said second portion of said trolley.

5. The apparatus according to claim 1, wherein:
said first chain drive means extend:
   along said path,
   at a higher level than the maximum height reached by said longitudinal and said transverse sides of said treatment tanks and
   in a position substantially aligned with the longitudinal center line of said treatment tanks or at the most offset of a distance such as not to exceed the vertical line passing through the longitudinal sides of said treatment tanks and
in each trolley said first portion of said trolley comprises an arm that extends downwards from said first chain drive means to said second portion of said trolley.

6. The apparatus according to claim 1, wherein said first chain drive means comprise a single chain adapted to selectively engage portions of said first trolleys to move said first trolleys along said first branch of said path.

7. The apparatus according to claim 1, wherein said second drive means for moving said trolleys in a return run from said downstream station to said upstream station comprise the return branch of said first chain drive means that extends from said downstream station to said upstream station.

8. The apparatus according to claim 1, wherein said second drive means for moving said trolleys in a return run from said downstream station to said upstream station comprise a friction conveyor.

9. The apparatus according to claim 1, wherein said first portion engageable integrally in translation with said first chain drive means comprises:
   an arm along which they are positioned:
      second hinge means to allow rotation about a vertical axis of a portion of said arm downstream of said second hinge means with respect to a portion of said arm closest to said first chain drive means;
      third hinge means to allow a rotation with respect to a horizontal axis of a portion of said arm downstream of said third hinge means with respect to a portion of said upstream arm closest to said first chain drive means so as to allow the second portion of each trolley to be rotated from a horizontal transverse position in which it advances in said path to a smaller vertical position;
   mechanical means for determining a rotation of said portions of said arm of each trolley about said vertical axis and/or said horizontal axis in proximity to or exiting from said downstream station and in proximity to or entering said upstream station, so as to allow a movement of said trolleys in said return path in a rotated smaller configuration.

10. The apparatus according to claim 1, wherein:
said engagement portion of said second portion of said trolleys comprises a lever having two opposite arms extending in extension of one another, a median portion of said lever being connected integral in rotation with said second portion of said trolleys, so that a rotation of said lever around an axis of rotation extended in said transverse direction causes an equal rotation of said second portion of said trolleys or said engagement portion of said second portion of said trolleys comprises a four-arm cross, a central portion of said cross being connected integral in rotation with said second portion of said trolleys, so that a rotation of said cross around an axis of rotation extended in said transverse direction causes an equal rotation of said second portion of said trolleys,
wherein the ends of said arms of said lever or of said cross engage with said cam elements arranged along said path to be guided so as to rotate said lever and/or said arms around said axis of rotation extended in said transverse direction.

11. The apparatus according to claim 1, wherein said cam elements arranged along said path are conformed to create a desmodromic engagement with said engagement portion of said second portion of said trolleys.

12. The apparatus according to claim 1, wherein said cam elements arranged along said path comprise one or more guide rails "C" shaped in cross-section, extended along said path.

13. The apparatus according to claim 12, wherein said one or more guide rails extend along the whole length of said path.

14. The apparatus according to claim 12, wherein:
said one or more guide rails are interrupted at one longitudinal inlet and one longitudinal exit of each treatment tank from said transverse sides and
at said longitudinal inlet and exit of each treatment tank, said cam elements comprise discontinuous stop element positioned to interfere with said portion of engagement of said second portion of said trolleys and to determine said complete revolution about said transverse rotation axis extended in said transverse direction of said trolleys at each treatment tank during the forward run of said trolleys along said path.

15. The apparatus according to claim 14, wherein said discontinuous stop elements include rolling rollers supported at a fixed position along said path so as to rotate around a respective axis of rotation extended in said transverse direction.

16. The apparatus according to claim 14, wherein for each treatment tank comprises:
   at said longitudinal inlet section a first stop element positioned lower than said rails and a second stop element positioned lower than said first stop element and longitudinally closer to the middle portion of the treatment tank than said first stop element;
   at said longitudinal exit section a third stop element positioned lower than said rails and a fourth stop element positioned between the height of said third stop element and the height of said rails and longitudinally further away from the middle portion of the treatment tank than said third stop element,
said first stop element and said second stop element determine a 180° overturning around said transverse rotation axis extended in said transverse direction of said trolleys in correspondence of said longitudinal inlet section, while said third stop element and said fourth stop element determine a second and subsequent 180° overturning around said transverse rotation axis extended in said transverse direction of said trolleys in correspondence of said longitudinal section of output.

17. The apparatus according to claim 16, wherein said portion of the engagement portion of said second portion of said trolley includes:
   a median portion capable of engaging in a desmodromic manner with said driving tracks and lever arms of a four-arm cruiser, suitable for interfering with said discontinuous stop elements during the advancement of each trolley along said path, to determine said trolley overturns at each longitudinal inlet and each longitudinal exit section of each tank.

18. The apparatus according to claim 17, wherein said median portion of said portion of the engagement portion comprises two rolling rollers supported by said portion of the engagement portion so as to be able to rotate around an axis of rotation extended in said transverse direction, said two rolling rollers being suitable to engage said guide rails in two points staggered longitudinally between them.

19. The apparatus according to claim 1, wherein said cam elements are provided at the opposite transverse sides of said treatment tanks where it is provided that a trolley and the relative structure of a hooked and transported vehicle must be turned upside down to be completely immersed in the treatment bath contained in said treatment tank, to cause a first reversal of said second portion of said trolleys when said trolleys are at an initial section of said treatment tank, identified with reference to the direction of advance of the trolleys along said path, and a second overturning of said trolleys in correspondence with a final section of said treatment tank.

* * * * *